(12) United States Patent
Mizukura et al.

(10) Patent No.: US 8,497,926 B2
(45) Date of Patent: Jul. 30, 2013

(54) INFORMATION PROCESSING APPARATUS, METHOD, AND PROGRAM

(75) Inventors: Takami Mizukura, Kanagawa (JP); Masafumi Wakazono, Kanagawa (JP)

(73) Assignee: Sony Corporation, Tokyo (JP)

( * ) Notice: Subject to any disclaimer, the term of this patent is extended or adjusted under 35 U.S.C. 154(b) by 509 days.

(21) Appl. No.: 12/799,904

(22) Filed: May 4, 2010

(65) Prior Publication Data

US 2010/0302404 A1    Dec. 2, 2010

(30) Foreign Application Priority Data

May 29, 2009   (JP) ................ P2009-131257

(51) Int. Cl.
*H04N 3/14* (2006.01)
*H04N 5/335* (2011.01)
*H04N 9/04* (2006.01)

(52) U.S. Cl.
USPC ............ 348/272; 348/273; 348/274

(58) Field of Classification Search
USPC ............ 348/272, 273, 274; 382/167
See application file for complete search history.

(56) References Cited

U.S. PATENT DOCUMENTS

| | | | |
|---|---|---|---|
| 6,437,792 B1 | 8/2002 | Ito et al. | |
| 2008/0204581 A1* | 8/2008 | Tsugita et al. | 348/273 |

FOREIGN PATENT DOCUMENTS

| | | |
|---|---|---|
| JP | 09-009082 A | 1/1997 |
| JP | 2000-278546 A | 10/2000 |
| JP | 2002-182634 A | 6/2002 |
| JP | 2002-218271 A | 8/2002 |
| JP | 2002-314828 A | 10/2002 |
| JP | 2003-244458 A | 8/2003 |
| JP | 2005-318491 A | 11/2005 |
| JP | 2007-142494 A | 6/2007 |
| JP | 2007-158948 A | 6/2007 |

* cited by examiner

*Primary Examiner* — Yogesh Aggarwal
(74) *Attorney, Agent, or Firm* — Sony Corporation

(57) ABSTRACT

An information processing apparatus includes a control unit for controlling a color gamut conversion method that converts a color gamut of content data into a desired color gamut in accordance with the use of the content data; and a color gamut conversion unit for performing the color gamut conversion with respect to the content data by a method based on the control of the control unit.

13 Claims, 30 Drawing Sheets

FIG. 4

| PERFORMANCE | SIMPLIFIED SHAPE COLOR GAMUT CONVERSION | COMPLICATED SHAPE COLOR GAMUT CONVERSION |
|---|---|---|
| COLOR GAMUT SHAPE AFTER CONVERSION | STANDARD RGB (sRGB) REGION | CAPABLE OF CORRESPONDING TO DIVERSE SHAPE COLOR GAMUTS |
| PROCESSING SPEED | FAST REAL-TIME PROCESS POSSIBLE | SLOW ASSUMING OFF-LINE PROCESS |
| CONTROL PARAMETER | SMALL QUANTITY (OR NONE) | LARGE QUANTITY |
| REQUIRED MEMORY | SMALL QUANTITY | LARGE QUANTITY |
| USED NUMBER OF OPERATION | SMALL QUANTITY | LARGE QUANTITY (OR 3DLUT INTERPOLATION OPERATION) |
| COLOR SPACE TO BE CONVERTED | SPACE OF RGB OR SPACE THAT CAN BE CONVERTED FROM RGB TO SIMPLIFIED COLOR CONVERSION | CIELAB, CIELUV, OR SENSIBLY EQUAL COLOR SPACE BASED ON THE SAME |

|  | x | y |
|---|---|---|
| RED | 0.64 | 0.33 |
| GREEN | 0.21 | 0.71 |
| BLUE | 0.15 | 0.06 |
| WHITE | 0.3127 | 0.329 |

COLOR TEMPERATURE AT WHITE POINT: 6500K

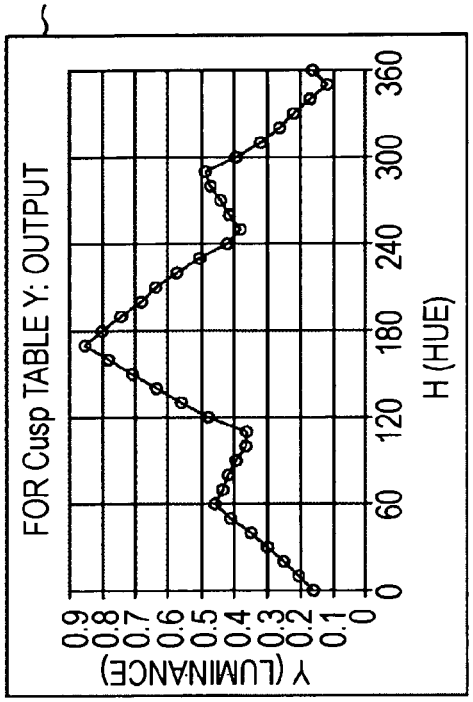
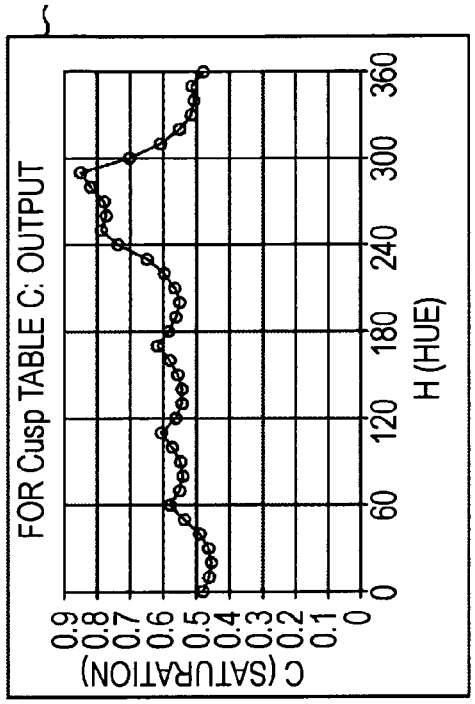
| HUE | Y | C |
|---|---|---|
| 0 | 0.1603 | 0.4844 |
| 10 | 0.2085 | 0.4642 |
| 20 | 0.2543 | 0.4590 |
| 30 | 0.3005 | 0.4679 |
| 40 | 0.3502 | 0.4925 |
| 50 | 0.4072 | 0.5369 |
| 60 | 0.4542 | 0.5797 |
| 70 | 0.4327 | 0.5506 |
| 80 | 0.4121 | 0.5403 |
| 90 | 0.3914 | 0.5468 |
| 100 | 0.3692 | 0.5714 |
| 110 | 0.3640 | 0.6026 |
| 120 | 0.4733 | 0.5592 |
| 130 | 0.5572 | 0.5434 |
| 140 | 0.6341 | 0.5421 |
| 150 | 0.7082 | 0.5537 |
| 160 | 0.7813 | 0.5787 |
| 170 | 0.8543 | 0.6188 |
| 180 | 0.8002 | 0.5808 |
| 190 | 0.7423 | 0.5567 |
| 200 | 0.6875 | 0.5505 |
| 210 | 0.6323 | 0.5614 |
| 220 | 0.5728 | 0.5913 |
| 230 | 0.5049 | 0.6445 |
| 240 | 0.4204 | 0.7332 |
| 250 | 0.3769 | 0.7901 |
| 260 | 0.4077 | 0.7762 |
| 270 | 0.4384 | 0.7863 |
| 280 | 0.4709 | 0.8220 |
| 290 | 0.4861 | 0.8507 |
| 300 | 0.3894 | 0.7006 |
| 310 | 0.3193 | 0.6101 |
| 320 | 0.2634 | 0.5547 |
| 330 | 0.2153 | 0.5229 |
| 340 | 0.1707 | 0.5091 |
| 350 | 0.1188 | 0.5158 |
| 360 | 0.1603 | 0.4844 |
FIG. 7

COLOR GAMUT
CLIP

COLOR GAMUT
CONVERSION

- - - RANGE VISIBLE TO HUMAN EYE      —— sRGB

|  | x | y |
|---|---|---|
| RED | 0.64 | 0.33 |
| GREEN | 0.3 | 0.6 |
| BLUE | 0.15 | 0.06 |
| WHITE | 0.3127 | 0.329 |

COLOR TEMPERATURE OF WHITE POINT: 6500 K

FIG. 24A
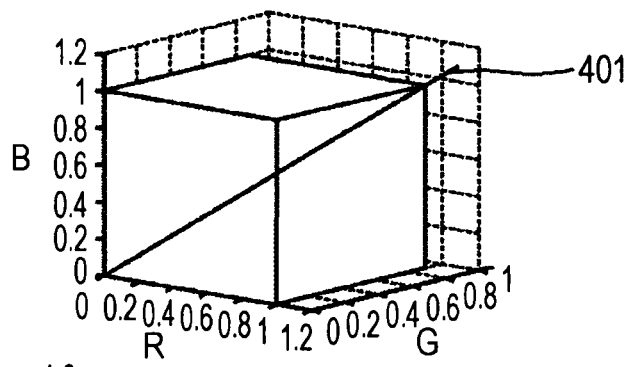
FIG. 24B
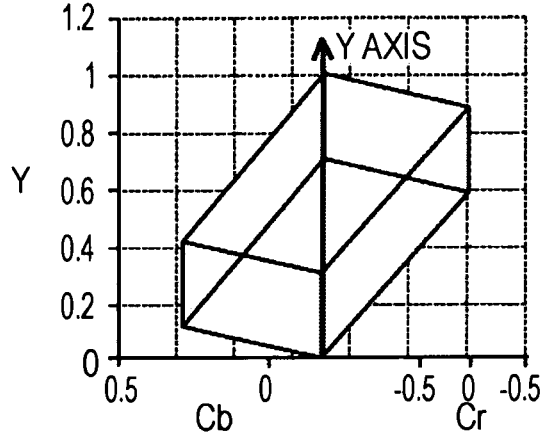
FIG. 24C
|  | R | G | B |
|---|---|---|---|
| RED | 1 | 0 | 0 |
| YELLOW | 1 | 1 | 0 |
| GREEN | 0 | 1 | 0 |
| CYAN | 0 | 1 | 1 |
| BLUE | 0 | 0 | 1 |
| MAGENTA | 1 | 0 | 1 |
FIG. 24D
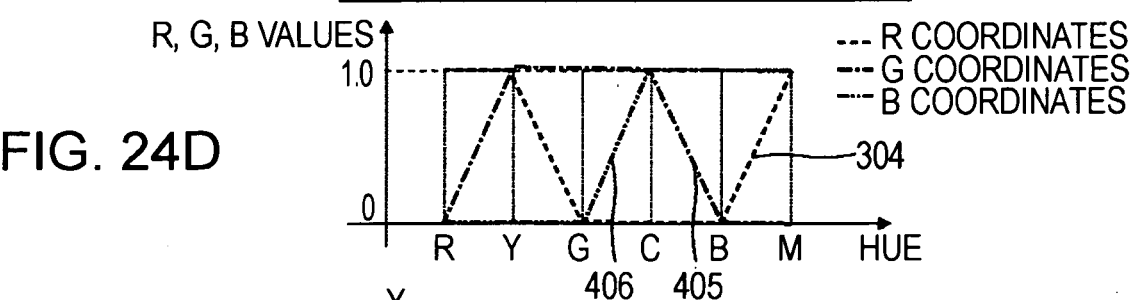
FIG. 24E
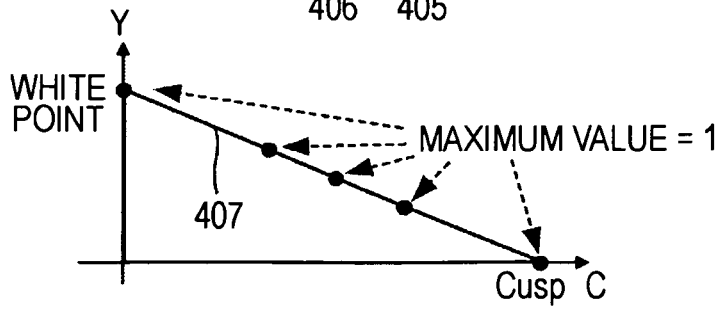

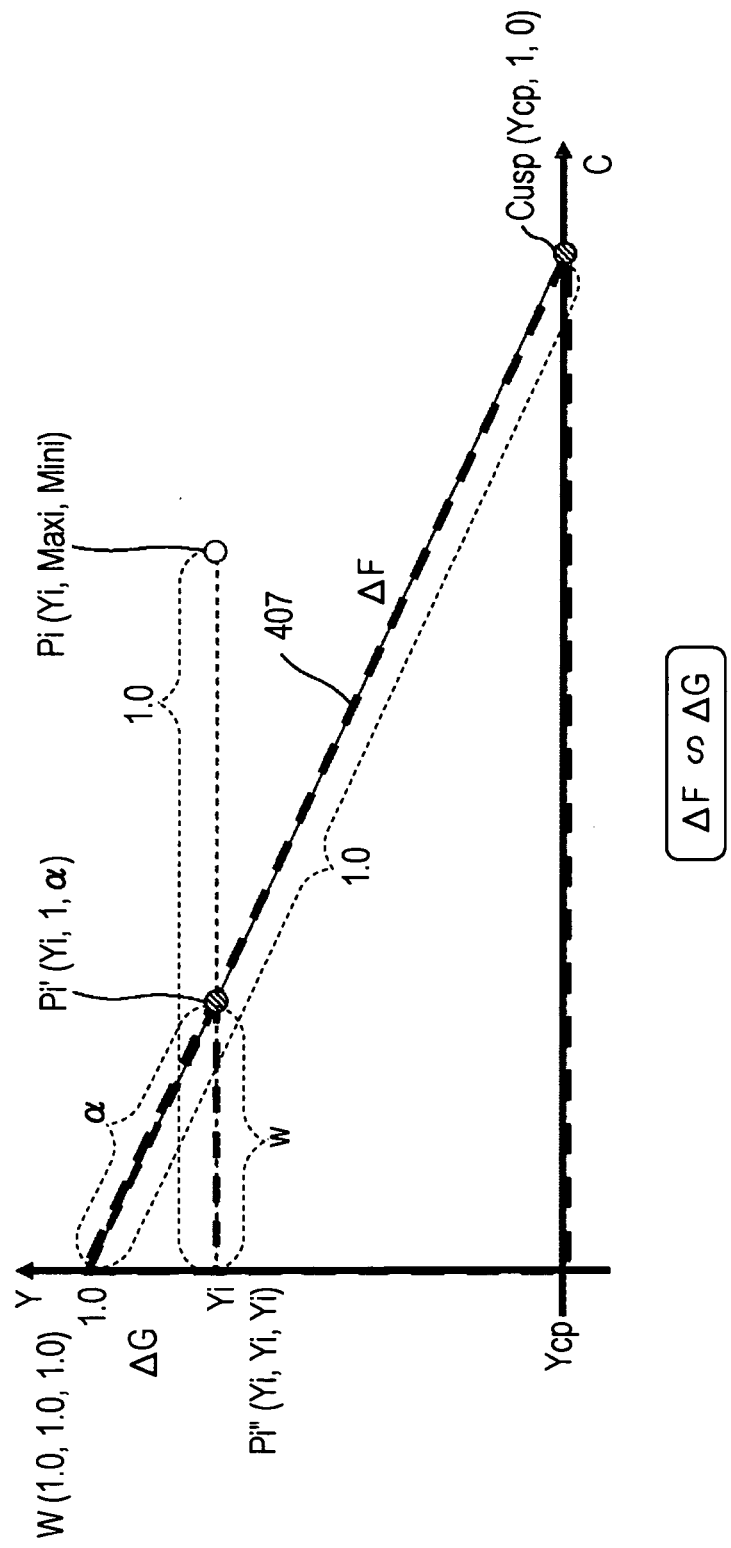

FIG. 30

| SUB-CONDITION | CONTENTS |
|---|---|
| IS COLOR GAMUT INFORMATION RECORDABLE TOGETHER WITH IMAGE DATA? | YES: SINCE IT IS POSSIBLE TO PERFORM COLOR GAMUT CONVERSION INTO APPROPRIATE STANDARD RGB SYSTEM AND THEN TO RECORD COLOR GAMUT META DATA OF THE RGB SYSTEM COLOR GAMUT AFTER CONVERSION AS IMAGE DATA, SIMPLIFIED SHAPE COLOR GAMUT CONVERSION IS PERFORMED<br>NO: COMPLICATED SHAPE COLOR GAMUT CONVERSION WHICH IS TYPICAL COLOR GAMUT CONVERSION PROCESS FOR STILL IMAGES IS PERFORMED |
| IS IT ASSUMED THAT PHOTOGRAPHING MODE IS ACCURATELY USED IN DISPLAY DEVICE? | YES: SINCE IT IS POSSIBLE TO PERFORM COLOR GAMUT CONVERSION INTO SUPPOSED DISPLAY DEVICE RGB SYSTEM COLOR GAMUT, SIMPLIFIED SHAPE COLOR GAMUT CONVERSION IS PERFORMED<br>NO: COMPLICATED SHAPE COLOR GAMUT CONVERSION WHICH IS TYPICAL COLOR GAMUT CONVERSION PROCESS FOR STILL IMAGES IS PERFORMED |
| CONTINUOUS SHOOTING MODE? | YES: COLOR GAMUT IS LIMITED TO CERTAIN STANDARD RGB COLOR GAMUT, AND SIMPLIFIED SHAPE COLOR GAMUT CONVERSION IS PERFORMED, TAKING SERIOUS VIEW OF PROCESSING SPEED<br>NO: COMPLICATED SHAPE COLOR GAMUT CONVERSION WHICH IS TYPICAL COLOR GAMUT CONVERSION PROCESS FOR STILL IMAGES IS PERFORMED |

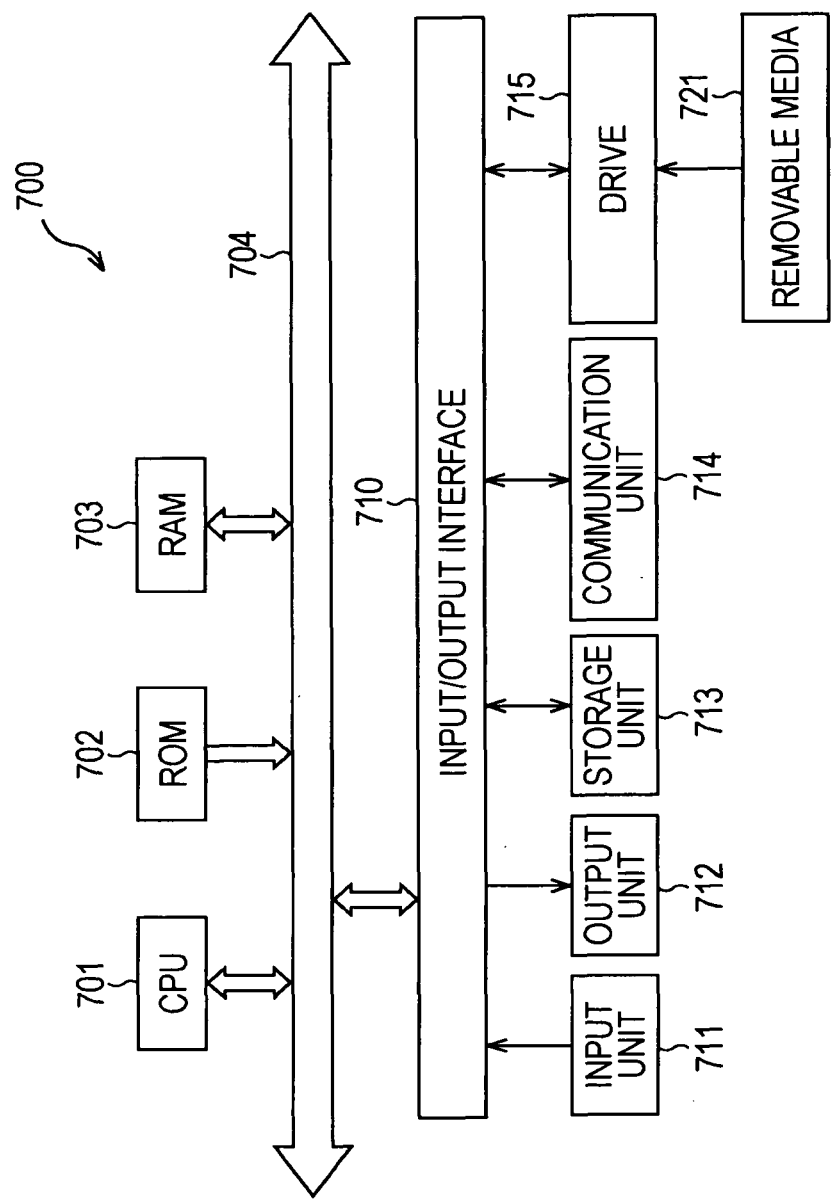

INFORMATION PROCESSING APPARATUS, METHOD, AND PROGRAM

CROSS-REFERENCE TO RELATED APPLICATION

The present application claims priority from Japanese Patent Application No. JP 2009-131257 filed in the Japanese Patent Office on May 29, 2009, the entire content of which is incorporated herein by reference.

BACKGROUND OF THE INVENTION

1. Field of the Invention

The present invention relates to an information processing apparatus, method, and a program. In particular, the present invention relates to an information processing apparatus, method, and a program which make it possible to appropriately perform color gamut conversion of content data.

2. Description of the Related Art

Recently, various kinds of digital image devices having different color representation areas have been increasing. As a method for coinciding colors with each other between devices having different color gamuts to output the coincident colors, a workflow has been proposed on the basis of an sRGB (standard RGB) that is the standard color space for monitors in the related art. However, with the appearance of many digital still cameras and video cameras capable of capturing colors outside the sRGB color gamut, many methods for color gamut conversion (i.e. compression/decompression) have been proposed as methods of smoothly outputting captured wide color gamut image data to devices having various color gamuts including wide color gamut displays and printers with suppression of color inconsistency or high-luminance and high-saturation color bleeding.

As methods for color gamut conversion, for example, there are a method having a complicated color gamut shape after conversion and a method having a simplified color gamut shape after conversion.

A complicated color gamut has the same shape as the color gamut of, for example, a print device such as a printer or the like. Generally, in the case of the print device, the color forming method is complicated due to the ink characteristics or the paper characteristics, and thus the shape of the color gamut, which is the color range that the device can reproduce, also becomes complicated.

In contrast, a simplified color gamut has the same shape as the color gamut of, for example, a display device such as an RGB monitor or the like. Generally, in the case of the display device, the color forming is performed by additive color mixing of light that RGB phosphors emit, and thus the shape of the color gamut, which is the color range that the device can reproduce, becomes simplified.

FIG. 1 is a diagram illustrating examples of compared shapes of various kinds of color gamuts.

As illustrated in FIG. 1, in the case of an Adobe RGB color gamut 1 or an sRGB color gamut 2 for a display device, the shape of the color gamut is simplified, for example, as its external shape is roughly in the form of a straight line. In contrast, a printer color gamut 3 for a print device has a complicated shape, for example, in which its whole external shape is roughly in the form of a curve.

Diverse methods for the color gamuts of images have been proposed, and methods that correspond to the complicated shape have also been proposed (e.g. see Japanese Unexamined Patent Application Publication No. 2000-278546 (corresponding to U.S. Pat. No. 6,437,792) and Japanese Unexamined Patent Application Publication No. 2007-158948).

For example, in Japanese Unexamined Patent Application Publication No. 2000-278546 (corresponding to U.S. Pat. No. 6,437,792), performing of color gamut conversion so that the color difference in a uniform color perception space is at a minimum by using a non-linear operation to correspond to even a complicated color gamut shape has been proposed. Also, for example, in Japanese Unexamined Patent Application Publication No. 2007-158948, a method of converting color gamut as preserving a gray axis using 3DLUT has been proposed.

In contrast, methods that correspond to the simplified shape have also been proposed (e.g. see Japanese Unexamined Patent Application Publication No. 2007-142494 and Japanese Unexamined Patent Application Publication No. 2003-244458). In Japanese Unexamined Patent Application Publication No. 2007-142494, a method of performing color gamut compression in a state where the space for performing the image process is kept RGB, almost linear operations are used and the color values are preserved has been proposed. Also, in Japanese Unexamined Patent Application Publication No. 2003-244458, a method of realizing simplified color gamut compression which can maintain the grayscale and adjust a used compression table by hue as performing the process in a state where RGB is kept as the color space has been proposed.

Generally, in the case of the color gamut conversion that corresponds to even the complicated color gamut shape, the load is large and a long operation time is necessary. Accordingly, it is not suitable to the color gamut conversion of a moving image that necessitates real-time (i.e. instant) image output.

Also, in the case of the method corresponding to the simplified color gamut shape, it is general that, although the load is small and high-speed operation is possible, the shape of the color gamut that can be used is limited or adjustable parameters are greatly limited in comparison to the method corresponding to the high-definition color gamut shape. Accordingly, unnatural appearance may occur depending upon the light source for observing the image or the scene of an image.

Since the methods proposed as described above have diverse advantages and defects, it is convenient if the color gamut conversion algorithms can be selectively used according to their purposes.

In contrast, methods for selectively using color gamut conversion algorithms have been proposed (e.g. Japanese Unexamined Patent Application Publication Nos. 2002-218271, 2002-314828, and 2005-318491). For example, in Japanese Unexamined Patent Application Publication No. 2002-218271, appropriate selection of one of a plurality of color gamut compression methods according to the kind of input manuscript has been proposed. In Japanese Unexamined Patent Application Publication No. 2002-314828, changing of color gamut conversion methods in accordance with the types of a plurality of subjects (e.g. natural images, graphics, texts, and the like) which exist together in one document has been proposed. Further, in Japanese Unexamined Patent Application Publication No. 2005-318491, a method of selecting one of plural algorithms (i.e. gamut mapping algorithms (GMA)) that perform color gamut mapping using ICC profiles prescribed in ICC (International Color Consortium) has been proposed.

Also, a method of dividing processing of a still image and a moving image has been considered (e.g. see Japanese Unexamined Patent Application Publication No. 2002-182634). In Japanese Unexamined Patent Application Publication No.

2002-182634, a method of automatically switching color reproduction methods according to differences between a still image and a moving image has been proposed.

SUMMARY OF THE INVENTION

However, in any one of Japanese Unexamined Patent Application Publication Nos. 2002-218271, 2002-314828, and 2005-318491, the color gamut conversion methods are just selected according to the kinds of content data or the functions of devices, but the color gamut conversion methods are not selected according to the use of content data. Also, as described in Japanese Unexamined Patent Application Publication No. 2002-182634, it is only possible to switch the color reproduction methods in accordance with differences between a still image and a moving image.

Accordingly, the applied color gamut conversion method may not be appropriate, and may unnecessarily deteriorate the picture quality. For example, depending upon whether an image is to be printed on paper or the like or to be displayed on a monitor, the necessary color gamut shape may differ. Accordingly, if the color gamut conversion method to be adopted is determined merely by the kinds of content data, the color gamut conversion may be performed in an inappropriate method, and this may cause the occurrence of color blending or the unnecessary reduction of color representation, resulting in unnecessary deterioration of picture quality.

Recently, since most digital cameras, video cameras, portable phones, and the like, can capture both a still image and a moving image, and many devices in which the above-described devices have been integrated, such as movie cameras, have appeared, it has been necessary that one device can process both still and moving images. That is, an appropriate use of the diverse color gamut conversion methods is necessary.

In view of the above situation, it is desirable to realize more appropriate color gamut conversion by using a plurality of color gamut conversion methods used for different purposes, for example, in accordance with the use of target content data to be processed.

According to an embodiment of the present invention, there is provided an information processing apparatus including: a control means for controlling a color gamut conversion method that converts the color gamut of content data into a desired color gamut in accordance with the use of the content data; and a color gamut conversion means for performing the color gamut conversion with respect to the content data by a method based on the control of the control means.

In the image processing apparatus according to an embodiment of the present invention, if the content data corresponds to a moving image, the control means selects an appropriate method according to the use of a moving image, while if the content data corresponds to a still image, the control means selects an appropriate method according to the use of a still image.

In the image processing apparatus according to an embodiment of the present invention, if the content data corresponds to a moving image, the color gamut conversion means performs a simplified shape color gamut conversion process that converts the color gamut of the content data into a simplified shape color gamut with respect to the content data, while if the content data corresponds to a still image, the color gamut conversion means performs a complicated shape color gamut conversion process that converts the color gamut of the content data into a complicated shape color gamut with respect to the content data.

In the image processing apparatus according to an embodiment of the present invention, if the content data corresponds to a still image, the control means restricts the use of the content data by further using a sub-condition, and if the content data satisfies the sub-condition, the control means selects the appropriate method according to the use of a moving image, while if the content data does not satisfy the sub-condition, the control means selects the appropriate method according to the use of a still image.

In the image processing apparatus according to an embodiment of the present invention, by the sub-condition, color gamut information can be added to the content data when the content data is recorded.

The image processing apparatus according to an embodiment of the present invention further includes an image capturing means for capturing a subject and generating the content data, wherein the sub-condition corresponds to a mode in which the image capturing means generates the content data for image display.

The image processing apparatus according to an embodiment of the present invention further includes an image capturing means for capturing a subject and generating the content data, wherein the sub-condition corresponds to a continuous capturing mode in which the image capturing means continuously performs the capturing.

According to another embodiment of the present invention, there is provided an information processing method including the steps of: controlling by the control means of an information processing apparatus a color gamut conversion method that converts the color gamut of content data into a desired color gamut in accordance with the use of the content data; and performing by color gamut conversion means of the information processing apparatus the color gamut conversion with respect to the content data by a method based on the control.

According to still another embodiment of the present invention, there is provided a program prompting a computer to function as: a control means for controlling a color gamut conversion method that converts the color gamut of content data into a desired color gamut in accordance with the use of the content data; and a color gamut conversion means for performing the color gamut conversion with respect to the content data by a method based on the control of the control means.

According to the embodiments of the present invention, the color gamut conversion method that converts the color gamut of the content data into the desired color gamut is controlled in accordance with the use of the content data, and the color gamut conversion is performed with respect to the content data by the method based on the control.

As described above, according to the embodiments of the present invention, the information can be processed. In particular, the color gamut conversion of the content data can be performed more appropriately.

BRIEF DESCRIPTION OF THE DRAWINGS

FIG. 4 is a diagram illustrating a difference in feature between color gamut conversion methods;

FIG. 7 is a diagram illustrating an example of a Cusp table;

FIGS. 24A to 24E are diagrams illustrating an example of a shape of mode conversion;

FIG. 25 is a diagram illustrating an example of a shape of Cusp information calculation;

FIG. 30 is a diagram illustrating example sub-conditions; and

FIG. 31 is a block diagram illustrating a main configuration example of a personal computer to which the present invention is applied.

DESCRIPTION OF THE PREFERRED EMBODIMENTS

Hereinafter, best modes (hereinafter, referred to as embodiments) for carrying out the present invention will be described. In addition, the explanation will be made in the following order.

1. First embodiment (control processing during recording)
2. Second embodiment (complicated shape color gamut conversion processing)
3. Third embodiment (simplified shape color gamut conversion processing)
4. Fourth embodiment (simplified shape color gamut conversion processing)
5. Fifth embodiment (control processing during recording)
6. Sixth embodiment (personal computer)

1. First Embodiment

[Configuration of a Device]

Figure 1:
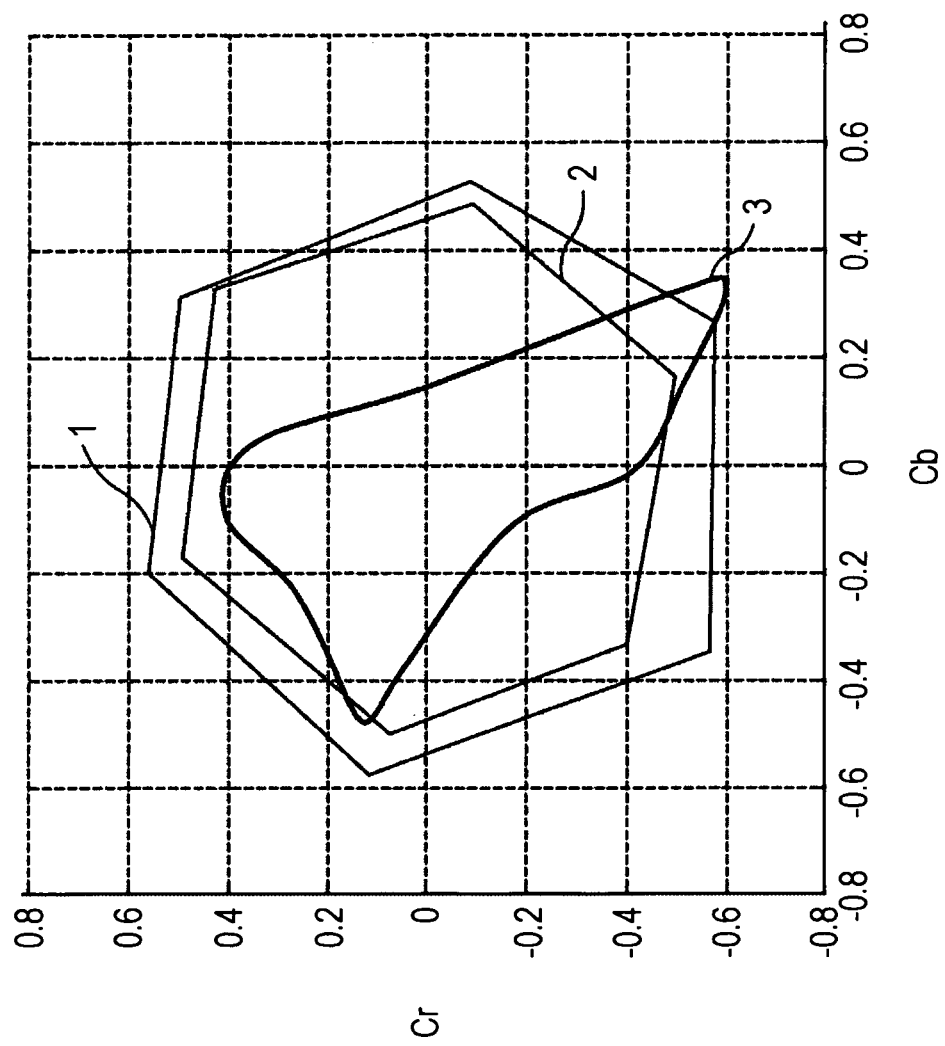
FIG. 1 is a diagram illustrating examples of compared shapes of various kinds of color gamuts.
Figure 2:
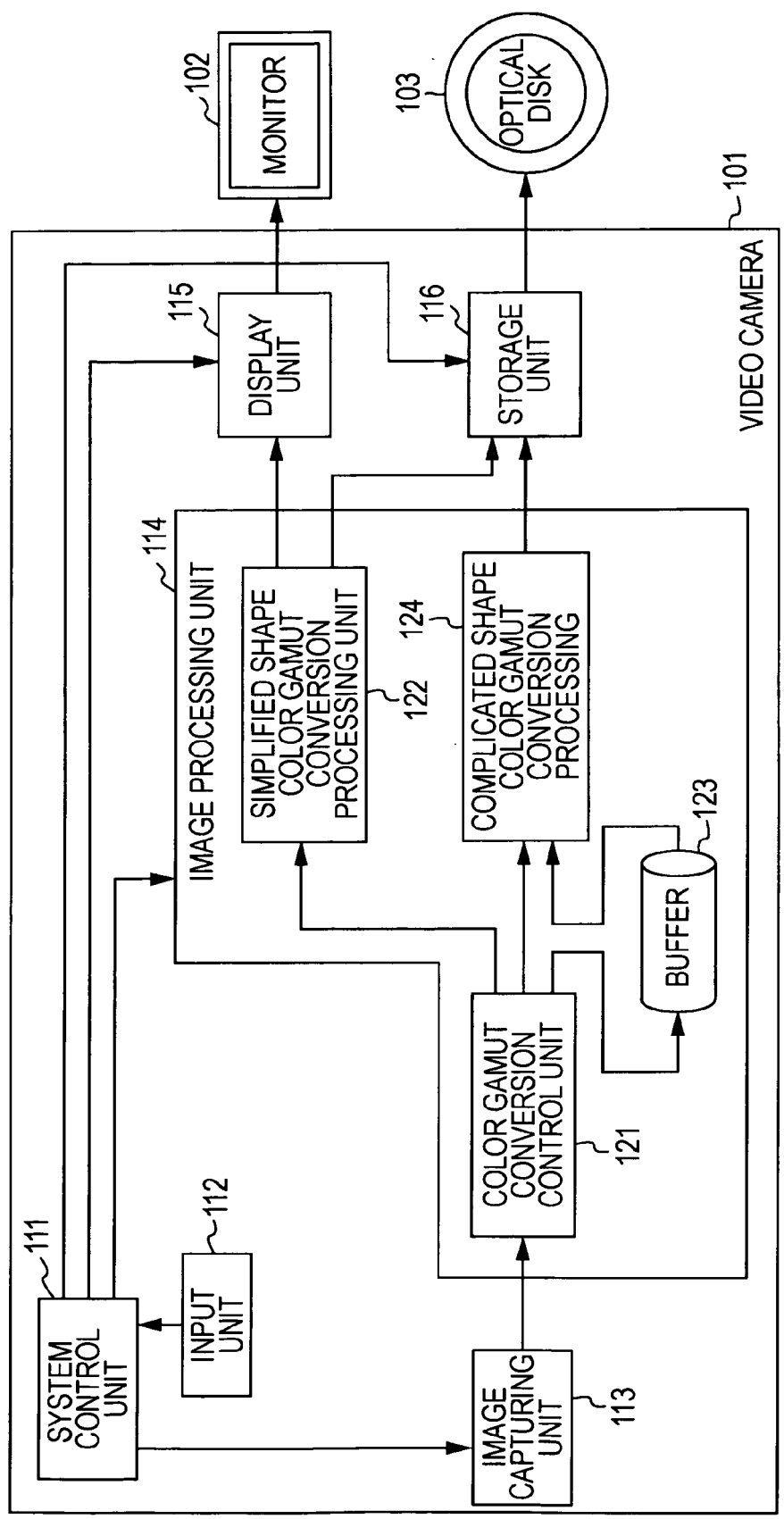
FIG. 2 is a diagram illustrating a configuration example of a video camera to which the present invention is applied.

FIG. 2 is a diagram illustrating a configuration example of a video camera to which the present invention is applied. As illustrated in FIG. 2, a video camera 101 captures a subject, generates image data of the subject, and displays the image on a monitor 102 or records the image data on an optical disc 103 that is a recording medium.

The video camera 101 has both a moving image capture function and a still image capture function. That is, an image of image data generated from the video camera 101 may be either of a moving image and a still image. Of course, the video camera 101 may be a digital still camera having a moving image capture function.

The video camera 101 has a system control unit 111, an input unit 112, an image capturing unit 113, an image processing unit 114, a display unit 115, and a recording unit 116.

The system control unit 111 controls the respective units of the video camera 101. The input unit 112, for example, is composed of switches, buttons, and the like, receives instructions input by a user (i.e. user instruction), and provides the user instruction to the system control unit 111. The system control unit 111 receives the user instruction, and controls the respective units according to the user instruction.

The image capturing unit 113 includes, for example, an optical system such as a lens, an iris, and the like, and an image sensor such as a CCD (Charge Coupled Device) or CMOS (Complementary Metal Oxide Semiconductor) sensor, captures a subject, generates image data of the subject, and provides the image data to a color gamut conversion control unit 121 of the image processing unit 114.

The image processing unit 114 performs image processing of the image data that is obtained from the image capturing unit 113. The image processing unit 114 includes a color gamut conversion control unit 121, a simplified shape color gamut conversion processing unit 122, a buffer 123, and a complicated shape color gamut conversion processing unit 124.

The color gamut conversion control unit 121 acquires the image data obtained by the image capturing unit 113, select to perform color gamut conversion by using either of the simplified shape color gamut conversion processing unit 122 and the complicated shape color gamut conversion processing unit 124 in accordance with the use of the image data, and provides the image data to the selected unit.

However, if the complicated shape color gamut conversion processing unit 124 is selected, the color gamut conversion control unit 121 simply provides the image data to the complicated shape color gamut conversion processing unit 124, and if necessary, provides the image data to the complicated shape color gamut conversion processing unit 124 after once maintaining the image data in a buffer 123.

For example, if the image data corresponds to a still image, its mainstream use is printing, and in the case of displaying the image on a monitor, the picture quality demands from user become higher in comparison to the case of displaying a moving image. Accordingly, the color gamut conversion control unit 121 selects the complicated shape color gamut conversion processing unit 124.

In contrast, if the image data corresponds to a moving image, its mainstream use is to display the image on the monitor. Also, since it is necessary that the image display is performed in real time (i.e. instantly), a high-speed color gamut conversion is necessary. Further, even in the case of displaying the image on the monitor, the picture quality demands from users become lower than that in the case of a still image. Accordingly, the color gamut conversion control unit 121 selects the simplified shape color gamut conversion processing unit 122.

That is, the color gamut conversion control unit 121 determines the color gamut conversion method according to the use of the image data that is estimated from the kind of the image data depending upon whether the image data is a moving image or a still image.

The simplified shape color gamut conversion processing unit 122 converts the color gamut of the provided image data into a simplified shape color gamut. The simplified shape color gamut conversion processing unit 122 provides the image data after the color gamut conversion to the display unit 115 or the recording unit 116.

The complicated shape color gamut conversion processing unit 124 converts the color gamut of the provided image data into a complicated shape color gamut. The complicated shape color gamut conversion processing unit 124 provides the image data after the color gamut conversion to the display unit 115 or the recording unit 116.

The simplified shape color gamut conversion processing unit 122 can perform the color gamut conversion at higher speed than that of the complicated shape color gamut conversion processing unit 124. However, since the complicated shape color gamut conversion processing unit 124 can perform the color gamut conversion of the image data into a more complicated shape color gamut than that converted by the simplified shape color gamut conversion processing unit 122, more accurate color gamut conversion can be performed.

As described above, the simplified shape color gamut conversion processing unit 122 and the complicated shape color gamut conversion processing unit 124 perform the color gamut conversion of the image data by a method determined by the color gamut conversion control unit 121.

The display unit 115 displays the image of the provided image data on the monitor 102. The recording unit 116 records the provided image data on a recordable optical disc 103 mounted on the recording unit 116 (i.e. drive).

The monitor 102 may be a video camera dedicated monitor installed in a housing of the video camera 101, or may be a general monitor, for example, such as a television receiver.

The optical disc 103 is an example of a recording medium (storage medium) that records the image data, and may be any one of the available recordable (i.e. additionally writable or correction-writable) media. For example, the optical disc may be may be a CD-R (Compact Disc-Recordable), CD-RW (Compact Disc-Rewritable), or the like. For example, the optical disc may be DVD±R (Digital Versatile Disc±Recordable) or DVD±RW (Digital Versatile Disc±Rewritable). Further, for example, the optical disc may be DVD-RAM (Digital Versatile Disc-Random Access Memory), BD-R (Blu-ray Disc-Recordable), BD-RE (Blu-ray Disc-Rewritable), or the like. If the optical disk corresponds to a recording device or a playback device, it may be even an optical disc (i.e. recording medium) outside these standards.

Also, instead of the optical disc 103, a flash memory, a hard disc, or a tape device may be used. Further, the optical disc 103 may not be a portable removable medium, and may be a built-in recording medium. Of course, the recording medium may be configured as a separate body from the video camera 101, for example, such as a peripheral device, a server, or the like.

In this case, the color gamut conversion is a process that changes the range of the color gamut. Accordingly, the color gamut conversion includes both the narrowing of the color gamut and the widening of the color gamut. For example, it includes the narrowing of the color gamut in a certain portion and the widening of the color gamut in another portion. Generally, the most color gamut conversions may be color gamut compression that narrows the color gamut. Accordingly, hereinafter, the color gamut compression will be basically exemplified. However, the following description can also be basically applied to the color gamut expansion that widens the color gamut.

In this case, as shown in FIG. 2, the video camera 101 may be an example of a recording device. The recording device may be a device except for the video camera, and may be any function device that performs the color gamut conversion. For example, the recording device may be an information processing device which acquires image data from the outside and performs image processing such as color gamut conversion processing or the like.

[Flow of Processing]

The video camera 101 as configured above performs appropriate color gamut conversion in accordance with the use of the image data by performing control process during recording when it outputs the image data obtained from the image capturing unit 113 to the monitor 102 or the optical disc 103.

With reference to the flowchart of FIG. 3, an example of a flow of control processing during recording will be described.

If the control processing during recording starts, the color gamut conversion control unit 121 determines whether the image data provided from the image capturing unit 113 is image data for recording that is to be recorded on the optical disc 103 on the basis of a user designation received by the input unit 112, a capturing mode of the image capturing unit 113, or the like, in step S101. If it is determined that the image data is the image data for recording of a moving image or a still image, the processing proceeds to step S102.

In step S102, the color gamut conversion control unit 121 determines whether the image data is a moving image. If it is determined that the image data is a moving image, the processing proceeds to step S103.

That is, the image data in this case is the image data for recording of a moving image. In this case, the image data is recorded on the optical disc 103, and a moving image is displayed on the monitor 102. Accordingly, the video camera 101 necessitates a real-time (i.e. instant) output of the image data. That is, it is necessary to perform the color gamut conversion process at high speed. Also, since the image data is a moving image, it is considered that the image data recorded on the optical disc 103 is mainly to be displayed on the monitor or the like. Further, since the image data is a moving image, the demand for the picture quality is relatively low.

From the foregoing, it is preferable to adopt the color gamut conversion by the simplified shape color gamut conversion processing unit 122 that can perform the color gamut conversion of the image data into a simplified shape color gamut which is close to the shape of the color gamut of the monitor at high speed. Accordingly, in this case, the color gamut conversion control unit 121 selects the simplified shape color gamut conversion processing unit 122, and provides the image data or the like to the simplified shape color gamut conversion processing unit 122.

In step S103, the simplified shape color gamut conversion processing unit 122 converts the color gamut of the image data into a simplified shape color gamut by performing the simplified shape color, gamut conversion process with respect to the provided image data. In step S104, the display unit 115 displays the image of the image data after the color gamut conversion on the monitor 102. Also, in step S105, the recording unit 116 records the image data after the color gamut conversion on the optical disc 103, and ends the control process during recording.

Also, in step S102, if it is determined that the image data is not a moving image, the processing proceeds to step S106.

That is, the image data in this case is the image data for recording of a still image. In this case, the image data is only recorded on the optical disc 103. In this case, the color gamut conversion process may be performed at low speed. However, since the image data is a still image, it is considered that the image data recorded on the optical disc 103 is mainly to be printed by a printer or the like. Further, since the image data is a still image, the demand for the picture quality is relatively high.

From the foregoing, it is preferable to adopt the color gamut conversion by the complicated shape color gamut conversion processing unit 124 that can perform the color gamut conversion of the image data into a complicated shape color gamut which is close to the shape of the color gamut of the printer or the like. Accordingly, in this case, the color gamut conversion control unit 121 selects the complicated shape color gamut conversion processing unit 124, and provides the image data or the like to the complicated shape color gamut conversion processing unit 124.

In step S106, the complicated shape color gamut conversion processing unit 124 converts the color gamut of the image data into a complicated shape color gamut by performing the complicated shape color gamut conversion process with respect to the provided image data. In step S107, the recording unit 116 records the image data after the color gamut conversion on the optical disc 103, and then ends the control process during recording.

Also, in step S101, if it is determined that the image data is not the image data for recording, the processing proceeds to step S108.

That is, the image data in this case is not the image data for recording, but is the image data of a monitor image (i.e. moving image). The monitor image is a moving image displayed on the monitor 102 for confirmation before the capturing is performed. That is, the image of the image data in this case is displayed on the monitor 102. Accordingly, it is necessary to perform the color gamut conversion process at high speed. Further, since the image data is a moving image and is for confirming the picture, the demand for the picture quality is low. Also, the image data has typically no use except for the display on the monitor 102.

From the foregoing, it is preferable to adopt the color gamut conversion by the simplified shape color gamut conversion processing unit 122 that can perform the color gamut conversion of the image data into a simplified shape color gamut which is close to the shape of the color gamut of the monitor 102 at high speed. Accordingly, in this case, the color gamut conversion control unit 121 selects the simplified shape color gamut conversion processing unit 122, and provides the image data or the like to the simplified shape color gamut conversion processing unit 122.

In step S108, the simplified shape color gamut conversion processing unit 122 converts the color gamut of the image data into a simplified shape color gamut by performing the simplified shape color gamut conversion process with respect to the provided image data. In step S109, the display unit 115 displays the image of the image data after the color gamut conversion on the monitor 102, and then end the control process during recording.

As described above, the video camera 101 can control the color gamut conversion method in accordance with the use of the image data, and perform the color gamut conversion more appropriately.

Here, an explanation of the complicated shape color gamut conversion and the simplified shape color gamut conversion will be made. In general, the color gamut of the image data during capturing is sufficiently large to be the equivalent of limitless. Accordingly, since the color that is expressed through the playback device or the output device in the post-end process may be destroyed, the input device predicts the color gamut of the output device to some extent, and performs the processing of the color of the image data so that the processed color enters into the color gamut, i.e. the color gamut conversion.

FIG. 4 is a diagram illustrating the difference in feature between the color gamut conversion methods. As illustrated in FIG. 4, the simplified shape color gamut conversion and the complicated shape color gamut conversion have different features.

For example, in the case of the simplified shape color gamut conversion, the image data can be color-gamut-converted only into the standard RGB color gamut (i.e. restricted color gamut) such as sRGB or the like, but in the case of the complicated shape color gamut conversion, the image data can be converted into diverse shape color gamuts.

Also, the processing speed of the simplified shape color gamut conversion side is higher than the processing speed of the complicated shape color gamut conversion side, and thus a moving image can be color-gamut-converted in real time (i.e. instantly). In contrast, the complicated shape color gamut conversion has a long delay time, and thus it is assumed that the complicated shape color gamut conversion is performed by so called offline processing using a buffer 123.

Also, the number of control parameters of the simplified shape color gamut conversion is smaller than the number of control parameters of the complicated shape color gamut conversion. In other words, a larger number of parameters are used for the complicated shape color gamut conversion, and thus more diverse controls can be performed through the complicated shape color gamut conversion.

Further, the memory capacity necessary for the simplified shape color gamut conversion is smaller than the memory capacity necessary for the complicated shape color gamut conversion. In the same manner, the number of used operations of the simplified shape color gamut conversion is smaller than the number of used operations of the complicated shape color gamut conversion. In other words, the complicated shape color gamut conversion necessitates a larger amount of used data or operations than that is necessary in the simplified shape color gamut conversion, and thus the processing is complicated with large load.

Also, in the case of the simplified shape color gamut conversion, the color space (i.e. the color space to be converted) used for the color gamut conversion is a space, for example, which corresponds to the RGB or in which the RGB can be converted into a simplified color conversion, while in the case of the complicated shape color gamut conversion, the color space is CIELAB, CIELUV, or a perceptibly equal color space based on the same.

As described above, it is frequent that the target color gamut of the simplified shape color gamut conversion basically becomes the standard color gamut that can be expressed in most devices, i.e. the same color gamut as sRGB. The color gamut that can be expressed in most devices such as sRGB is generally narrow, and this may cause even the color that can be expressed by an output device to be converted. This risk becomes a tradeoff for expressing the color gamut at high speed without destroying the color.

In contrast, the target color gamut of the complicated shape color gamut conversion is not limited to the color gamut of the standard RGB system. For example, if the output device has already been known at a time point where the image data is captured, the color gamut information of the device is obtained in advance, and a high-precision color gamut conversion is performed, so that, for example, even the color gamut having the complicated shape such as the printing device can be converted.

Also, once the color gamut of the image data has been converted into sRGB, the color may be restricted when it is output through a device having a wide color gamut such as a wide color gamut TV or the like. Even in the case of using a simplified shape color gamut compression algorithm in order to avoid such risk, it is possible to convert the color gamut of the image data into the color gamut of a wide color gamut TV if the color gamut of the image data is converted into the standard RGB color gamut (e.g., Adobe RGB, wide RGB, bg-RGB, sc-RGB, or the like) that is somewhat wider than the sRGB or if the color gamut information of a wide color gamut TV having a high use frequency is known in advance by a user designation or the like.

As described above, by estimating the use of the image data that is obtained through capturing of a subject depending upon whether the image data is a moving image or a still image and changing the color gamut conversion algorithm according to the use, the video camera 101 can appropriately select and use the simplified shape color gamut conversion and the complicated shape color gamut conversion, and thus problems occurring due to the use of only one kind of color gamut conversion method can be suppressed.

As described above, although it is exemplified that the video camera 101 is provided with two color gamut conversion processing units which are the simplified shape color gamut conversion processing unit 122 and the complicated shape color gamut conversion processing unit 124, the number of color gamut conversion processing units is optional, and three or more color gamut conversion processing units may be provided. In this case, the color gamut conversion control unit 121 may select one of three or more color gamut conversion methods.

Also, the video camera 101 may be provided with one or more color gamut conversion processing units in which the color gamut conversion method can be changed by a control parameter or the like under the control of the color gamut conversion control unit 121. That is, for example, the simplified shape color gamut conversion processing unit 122 and the complicated shape color gamut conversion processing unit 124 may be integrally configured.

In this case, for example, the color gamut conversion control unit 121 designates the color gamut conversion method or sets values of control parameters and the like in accordance with the use of the image data (i.e. content data), and the color gamut conversion processing unit performs the color gamut conversion in a method based on the control.

2. Second Embodiment

[Complicated Shape Color Gamut Conversion Processing]

Figures 5A, 5B:
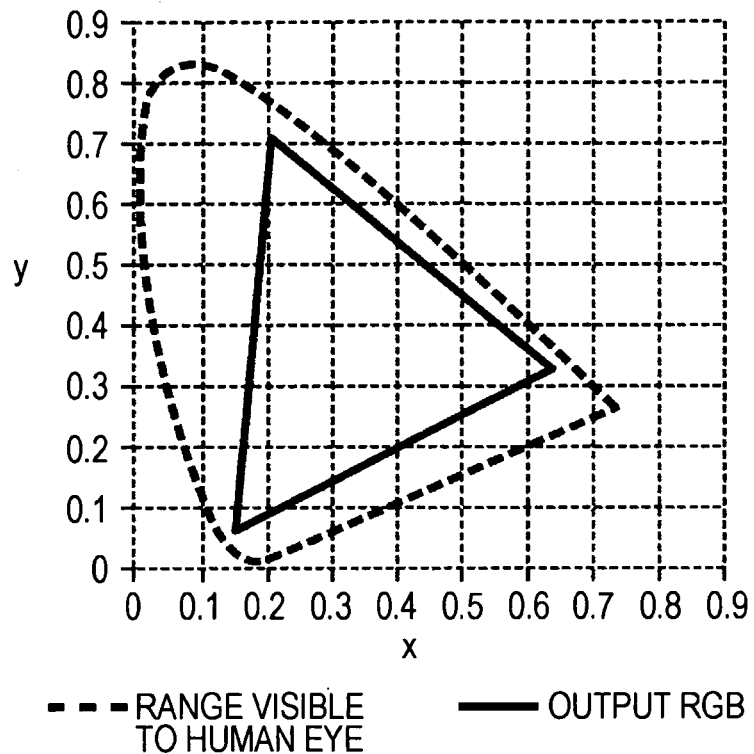
FIGS. 5A and 5B are diagrams illustrating an example of chromaticity information of an output color gamut.

Next, details of the complicated shape color gamut conversion processing will be described. By the complicated shape color gamut conversion processing, the color gamut of the image data is converted into an output color gamut (i.e. output RGB) of the chromaticity information as illustrated in FIGS. 5A and 5B.

Now, it is assumed that a user has designated still image capturing through the input unit 112 and the instruction has reached respective units through the system control unit 111. The color gamut conversion control unit 121 selects the complicated shape color gamut conversion processing unit 124, and provides the image data obtained from the image capturing unit 113 to the complicated shape color gamut conversion processing unit 124.

The complicated shape color gamut compression method that is performed in the embodiment of the present invention will be described.

Figure 6A:
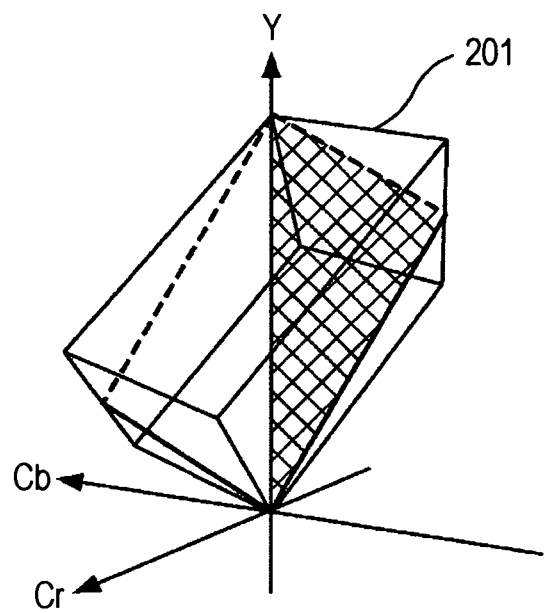
FIGS. 6A and 6B are diagrams illustrating an example of a color gamut.
Figure 6B:
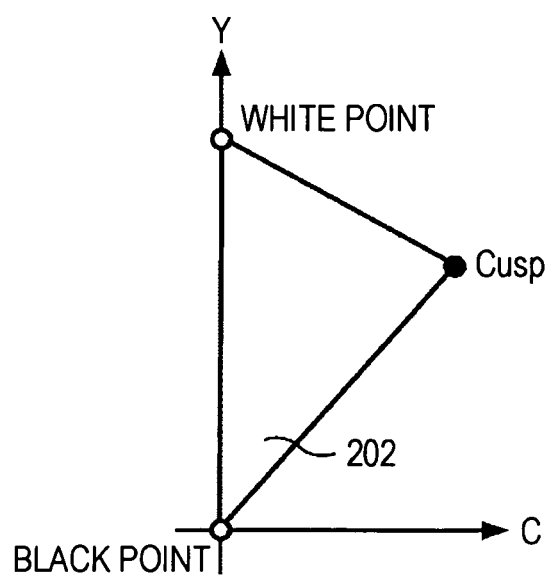

As illustrated in FIG. 6A, in the case where the color gamut of a certain device is expressed in a YCC (Y, Cb, Cr) space (i.e. color gamut 201), a plane obtained by cutting a equal-saturation plane, as illustrated in FIG. 6B, can be expressed as a two-dimensional YC plane having a vertical axis that represents luminance (Y) and a horizontal axis that represents saturation (C) (i.e. color gamut 202). The color gamut shape on this plane can approximate to a triangle that connects a white point, a black point, and the maximum saturation point Cusp as shown as the color gamut 202 indicated in FIG. 6B if CY coordinates of the maximum saturation point Cusp is known. By maintaining CY coordinates (i.e. Cusp information) of Cusp points on several representative hue surfaces H as a numeral table using this property, the color gamut 201 of the device can be approximately defined. The table of CY coordinates (Cusp information) of the maximum saturation points Cusp of the representative hues is called a Cusp table.

FIG. 7 is a diagram illustrating an example of the Cusp table. The graph 211-1 shows the luminance Y of the Cusp point for the hue H. The graph 211-2 shows the saturation C of the Cusp point for the hue H. Also, the table 212 shows values of luminance Y and saturation C of the representative hue H. Since the luminance or the saturation between the representative hue values (i.e. intermediate hue values) can be easily obtained by performing interpolation process using values of the table 212, the graph 211-1, the graph 211-2, and the table 212 are roughly equivalent information. As described above, in the Cusp table, the CY coordinates of the Cusp points are indicated for at least the representative saturation, and its format is optional.

The complicated shape color gamut conversion processing unit 124 performs the color gamut conversion (compression or decompression) using the above-described Cusp table. Hereinafter, the details of the color gamut conversion process will be described.

Figure 8:
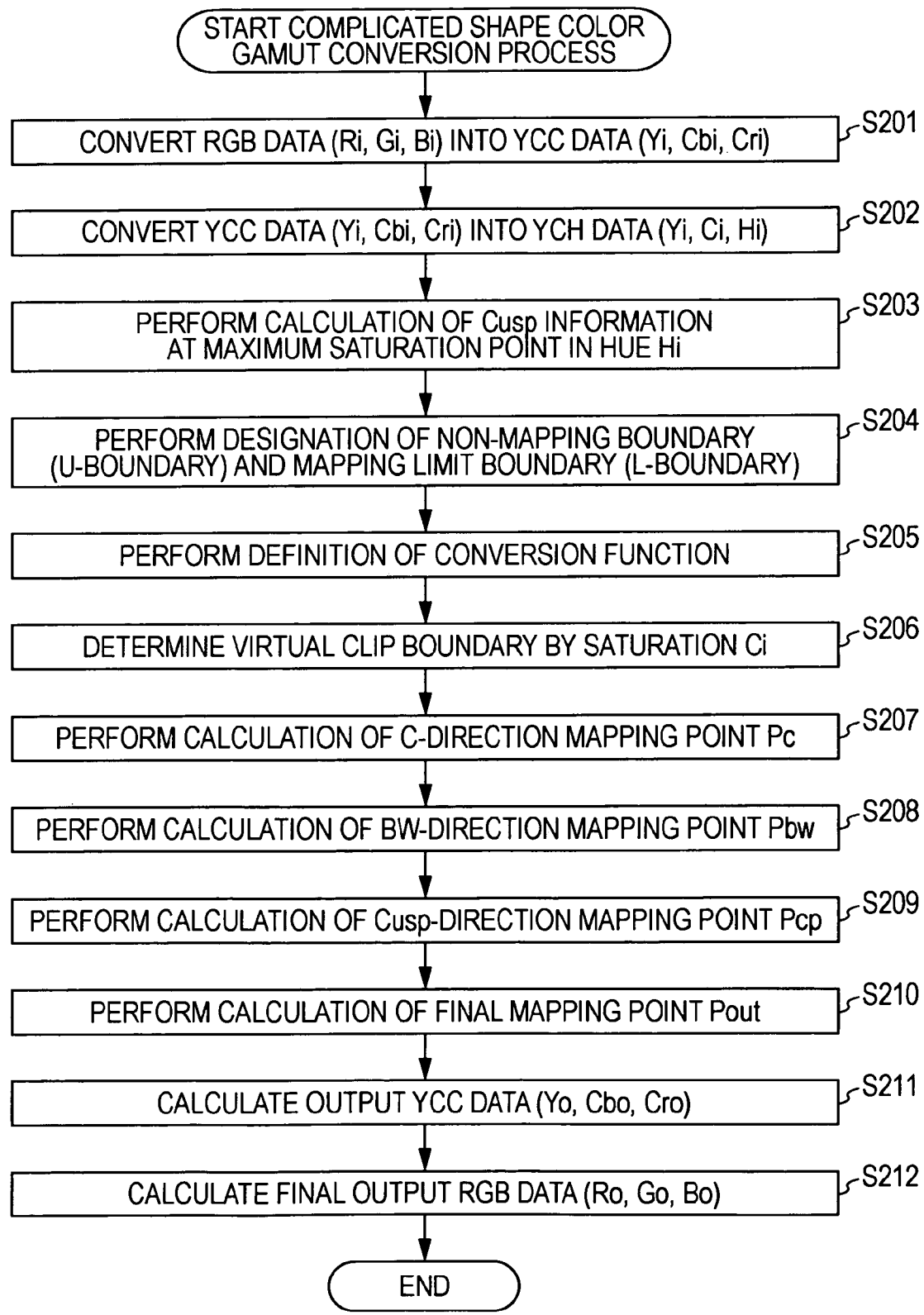
FIG. 8 is a flowchart illustrating an example of a flow of complicated shape color gamut conversion processing.

Referring to the flowchart of FIG. 8, an example of a flow of a complicated shape color gamut conversion process will be described. If necessary, explanation will be made with reference to FIGS. 9 to 15.

If the complicated shape color gamut conversion process starts, the complicated shape color gamut conversion processing unit 124 performs conversion of RGB data (Ri, Gi, Bi) of a processed pixel into YCC data (Yi, Cbi, Cri) that is luminance and color difference data by performing calculation, for example, as shown in Equation (1) below so that color blending does not occur due to the color gamut conversion in step S201.

$$\begin{pmatrix} Yi \\ Cbi \\ Cri \end{pmatrix} = \begin{pmatrix} 0.2990 & 0.5870 & 0.1140 \\ -0.1687 & -0.3313 & 0.5000 \\ 0.5000 & -0.4187 & -0.0813 \end{pmatrix} \cdot \begin{pmatrix} Ri \\ Gi \\ Bi \end{pmatrix} \quad (1)$$

Then, the complicated shape color gamut conversion processing unit 124 converts the format of the processed pixel from YCC (Yi, Cbi, Cri) to YCH (Yi, Ci, Hi) (i.e. converts the coordinate system from YCC coordinates into YCH coordinates) by performing calculation, for example, a shown in Equations (2) to (4) below in step S202.

$$Yi = Yi \quad (2)$$

$$Ci = \sqrt{Cbi^2 + Cri^2} \quad (3)$$

$$\begin{cases} \text{if } Cri > 0 \\ \quad Hi = \arctan\left(\dfrac{Cri}{Cbi}\right) \cdot \dfrac{180}{\pi} \\ \text{else} \\ \quad Hi = \arctan\left(\dfrac{Cri}{Cbi}\right) \cdot \dfrac{180}{\pi} + 360 \end{cases} \quad (4)$$

If the format is converted, the complicated shape color gamut conversion processing unit 124 calculates CY coordinate information (Ccp, Ycp) of the maximum saturation point (Cusp point) of the respective hues Hi of the target color gamut in step S203. In this case, since the target color gamut has been determined at a time point where the color gamut conversion processing starts (i.e. also has the color gamut information), the CY coordinate information of the Cusp point can be obtained from the information of the target color gamut (e.g. YCC data).

In step S204, the complicated shape color gamut conversion processing unit 124 designates the non-mapping boundary and a mapping limit boundary.

Figure 9:
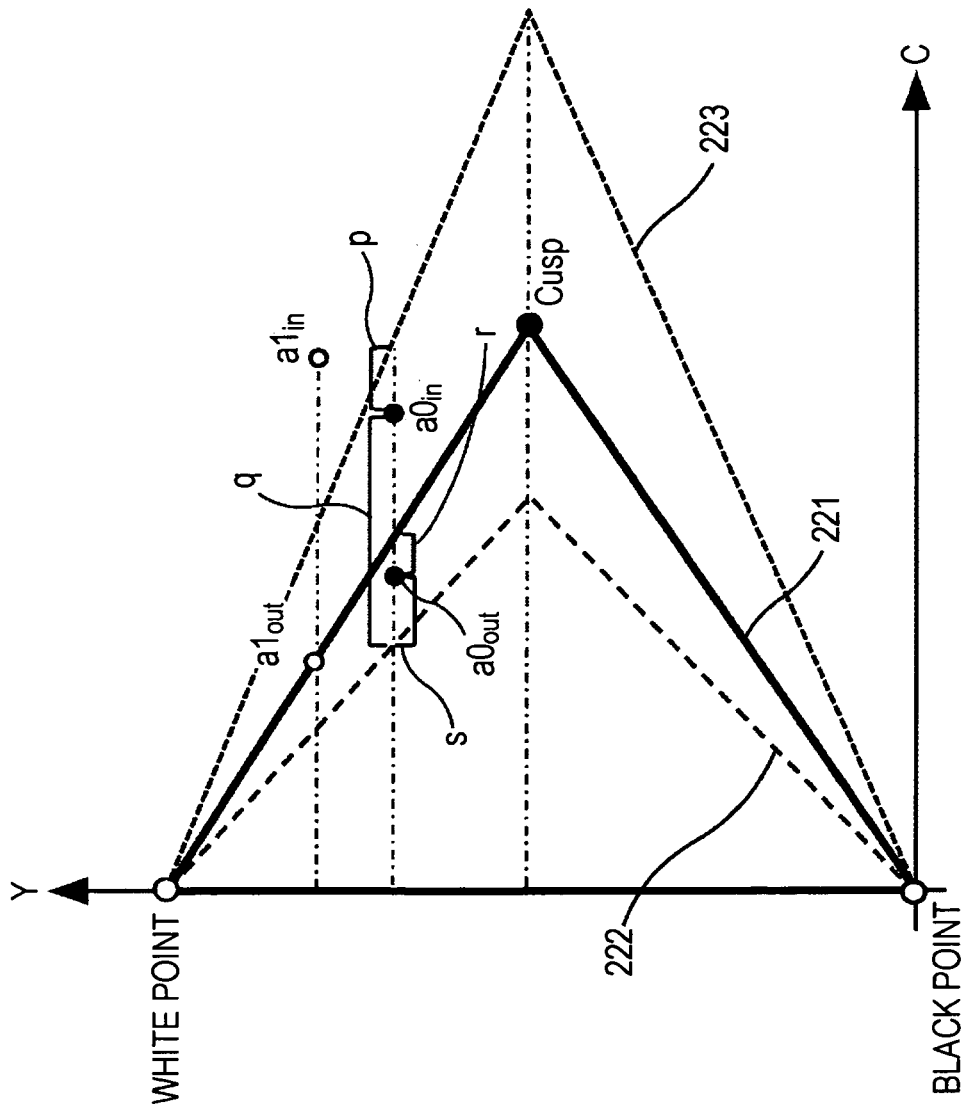
FIG. 9 is a diagram illustrating an example of shapes of color gamut conversion.

FIG. 9 is a diagram illustrating an example of shapes of color gamut conversion. In FIG. 9, an area surrounded by a thick line (i.e. an area surrounded by a triangle having a white point, a black point, and Cusp point as its apexes) is a final target compressed area, that is, a target color gamut. A T-boundary (Target boundary) 221 is a border (i.e. boundary) except for Y-axis of the target area. A boundary that is somewhat small in saturation direction on the basis of the T-boundary 221 is a non-mapping boundary (i.e. U-boundary (Uncompressed boundary)) 222. An area surrounded by the Y-axis and the U-boundary 222 is the non-mapping area, and pixels included therein are not color-gamut-converted (coordinate-moved). Next, it is necessary to designate to what extent the area is converted into the target compressed area. A boundary for designating the extent to which the color gamut of the color of the image content data is spread is an L-boundary (mapping Limit boundary) 223. In the color gamut conversion, the L-boundary 223 becomes the boundary that is expanded in the saturation direction from the T-boundary 221. That is, the color gamut conversion means the conversion of the area surrounded by the U-boundary 222 and the L-boundary 223 into an area surrounded by the U-boundary 222 and the T-boundary 221.

In indicating the color gamut conversion only in the saturation direction, $a0_{in}$ of FIG. 9 is coordinate-moved, for example, to $a0_{out}$ by the color gamut conversion. In this case, colors of saturation higher than that of the L-boundary 223 are all clipped to the T-boundary 221 (i.e. are all coordinate-moved onto the T-boundary 221). For example, $a1_{in}$ of FIG. 9 is coordinate-moved to $a1_{out}$.

Figure 10A:
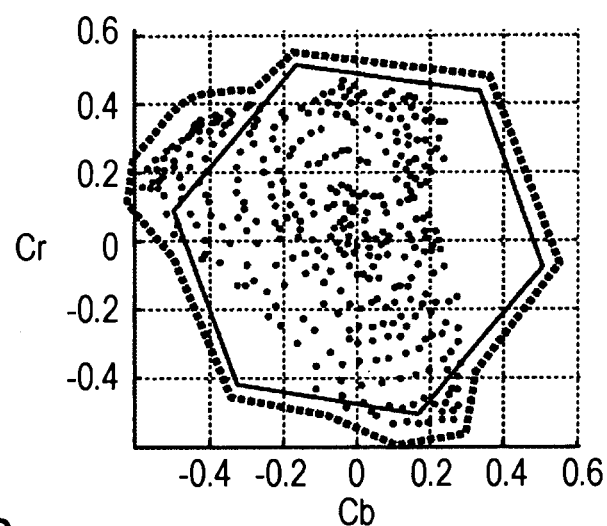
FIGS. 10A and 10B are diagrams illustrating an example of an LU table.
Figure 10B:
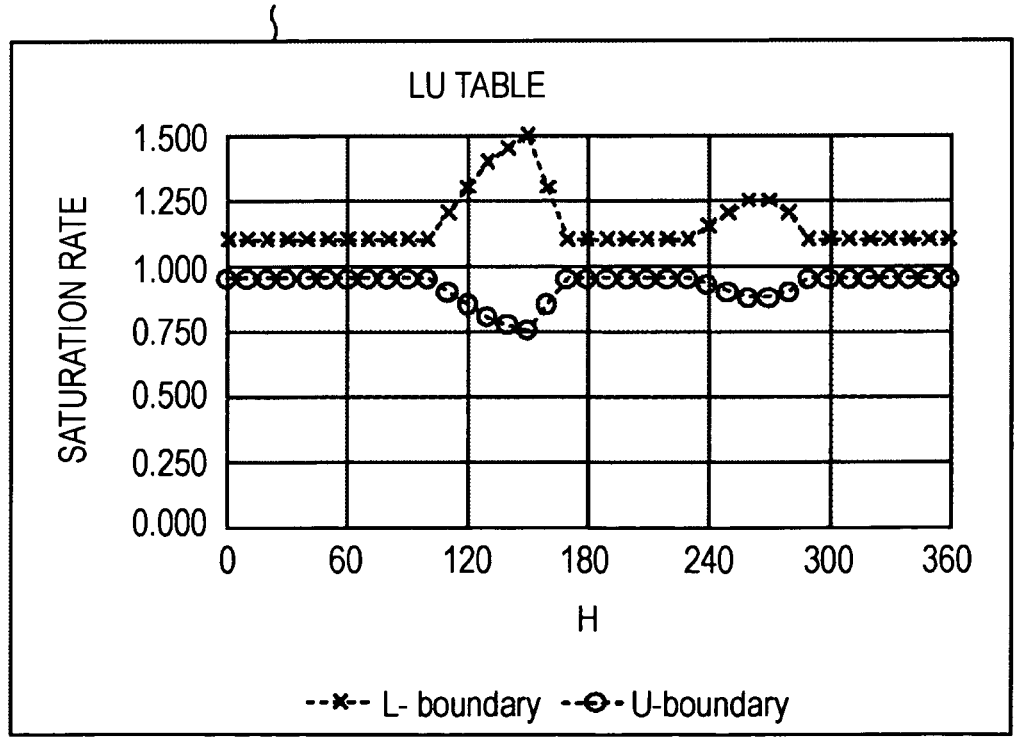

FIGS. 10A and 10B are diagrams illustrating an example of an LU table. The LU table 231 as illustrated in FIG. 10B is table information that indicates the saturation of the designated non-mapping boundary (i.e. U-boundary 222) and the mapping limit boundary (i.e. L-boundary 223) for respective hue at the rate based on the T-boundary 221 (i.e. saturation rate). If colors indicated by points correspond to high-saturation color distribution existing in the world as illustrated in FIG. 10A in the case where it is difficult to limit the color gamut of an image before the color gamut conversion, such as an image captured by a digital still camera, a video camera, or the like, the LU table 231 as illustrated in FIG. 10B can be obtained by setting the L-boundary to be somewhat larger centering around a portion that projects from the color gamut of an RGB space that is indicated as a hexagon and determining the U-boundary side according to the rule of U-boundary=1.0−((L-boundary−1.0)/2). In FIGS. 10A and 10B, although the whole hue is set at a constant saturation rate of the L-boundary to the U-boundary (e.g. the L-boundary is set to 1.5 and the U-boundary is set to 0.75), these values may be changed for respective hue.

The determination of the saturation rate of the L-boundary to the U-boundary is optional. For example, the complicated shape color gamut conversion processing unit 124 may maintain in advance the LU table 231 as illustrated in FIGS. 10A and 10B, or the LU table may be acquired from the outside.

Referring again to FIG. 8, the complicated shape color gamut conversion processing unit 124 defines a conversion function in step S205.

Figure 11:
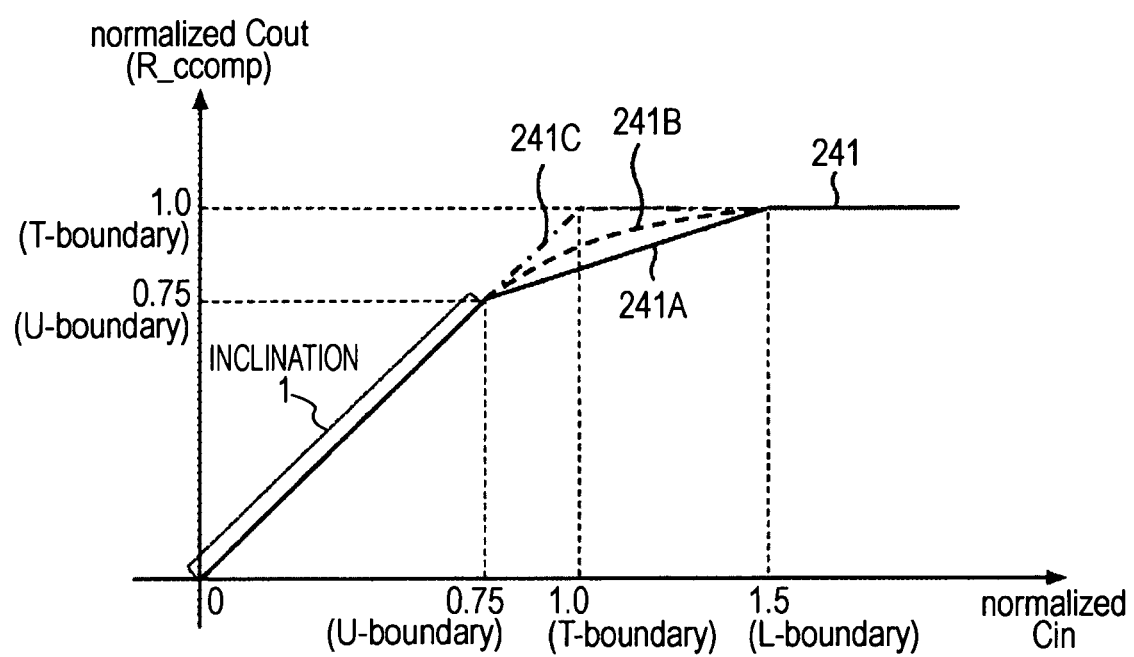
FIG. 11 is a diagram illustrating an example of a conversion function.

For example, if the shape of the color gamut conversion when Hi=150° in FIGS. 10A and 10B is indicated as a function, it becomes a curve 241 as illustrated in FIG. 11. In this case, the saturation rate of the U-boundary 222 is 0.75 and the saturation rate of the L-boundary 223 is 1.5. This curve 241 is called a conversion function (or a mapping function). The range in which the slope is 1 represents the non-mapping area. The color gamut conversion indicates the compression of the range surrounded by the U-boundary 222 and the L-boundary 223 of the horizontal axis into the range surrounded by the U-boundary 222 and the T-boundary 221 of the vertical axis. At this time, the conversion method is optional, and diverse methods may be considered. For example, the solid line 241A means a linear compression. The dashed line 241B is an example obtained by performing gradual compression through smooth bending of the function. The dashed dotted line 241C means a color gamut clip in the T-boundary 221 rather than the compression.

That is, along the shape of the curve 241 in this range, for example, as shown in FIG. 9, the ratio (r:s) of the distance up to the T-boundary 221 to the distance up to the U-boundary 222 of $a0_{out}$, which is the movement place of $a0_{in}$ of which the ratio of the distance up to the L-boundary 223 to the distance up to the U-boundary 222 is p:q as shown in FIG. 9, is determined. In other words, the function (i.e. conversion function) indicated by the curve 241 in FIG. 11 indicates the compression rate R_ccomp in the saturation direction of any pixel to be processed, and a virtual clip boundary of the pixel to be processed is determined by the output values of the function.

The mapping function is determined depending upon the values of the L-boundary 223 and the U-boundary 222, and if the values of the L-boundary 223 and the U-boundary 222 are changed for respective hues, the mapping function is also changed.

Referring again to FIG. 8, the complicated shape color gamut conversion processing unit 124 determines the virtual clip boundary in step S206.

Figure 12:
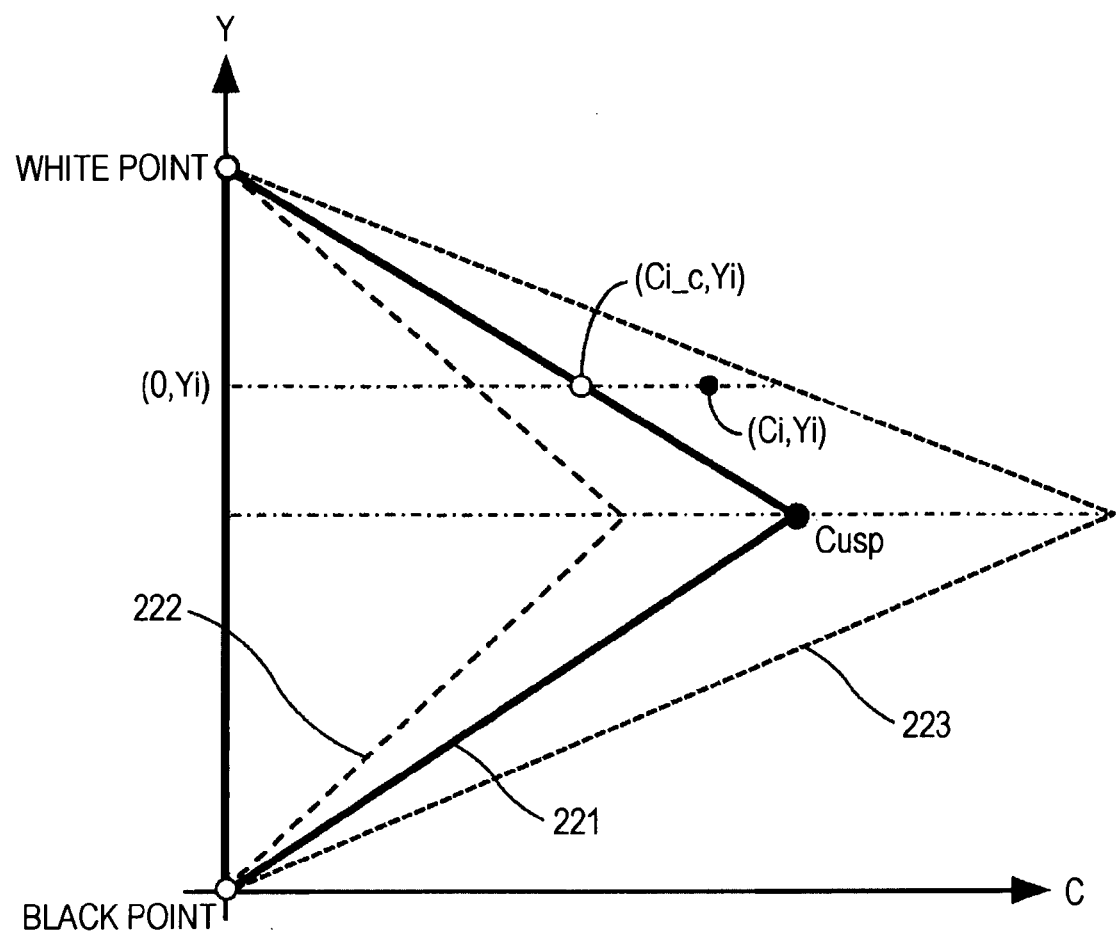
FIG. 12 is a diagram illustrating an example of a method of calculating saturation.

The complicated shape color gamut conversion processing unit 124 refers to the defined conversion function in the processing in step S205 using the saturation Ci of the pixel to be processed. However, since the conversion function has a value obtained by normalizing the saturation in the T-boundary 221 to "1", it is necessary to obtain the saturation Ci_c in the T-boundary 221 of the luminance such as the pixel to be processed. If it is assumed that the CY coordinates of the pixel to be processed (the pixel subject to processing) are (Ci, Yi), the saturation Ci_c in the T-boundary 221 of the luminance which is the same as that in the pixel to be processed, for example, as illustrated in FIG. 12, can be obtained as the saturation of the cross point of the straight line that connects the white point and Cusp point and the straight line that connects the pixel (Ci, Yi) to be processed and the luminance point (0, Yi) of the pixel to be processed on the Y-axis.

Using the saturation Ci_c at the cross point Ci_c and the saturation Ci of the pixel to be processed, the saturation Ci_norm for referring to the conversion functions can be calculated using Equation (5) below.

$$Ci\_norm = \frac{Ci}{Ci\_c} \qquad (5)$$

For example, the complicated shape color gamut conversion processing unit 124 determines the saturation direction compression rate R_ccomp of the pixel to be processed using the saturation Ci_norm with reference to the conversion function indicated by the curve 241 of FIG. 11. Once the R_ccomp is determined, a virtual clip boundary (V-boundary) of the pixel to be processed can be determined. By determining the V-boundary as described above, the color gamut conversion may be considered as a process of repeatedly performing the color clip for the virtual clip boundary.

Figure 13A:
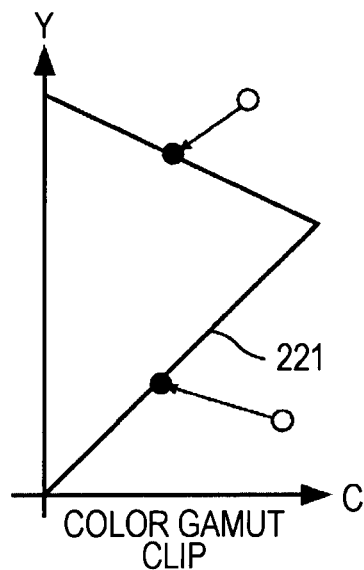
FIGS. 13A and 13B are diagrams illustrating comparison of a color gamut clip and a shape of color gamut conversion.
Figure 13B:
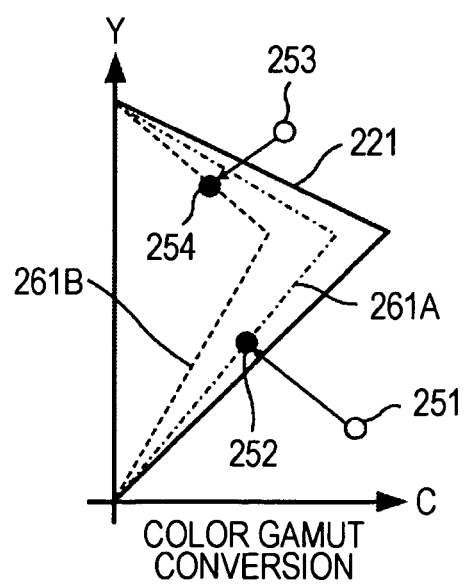

FIGS. 13A and 13B are diagrams illustrating comparison of a color gamut clip and the shape of color gamut conversion. FIG. 13A is a diagram illustrating the shape of the color gamut clip. The color gamut clip, as shown in FIG. 13A, indicates the movement of a color of the outside of the target color gamut onto the T-boundary 221 that is the boundary of the target color gamut (i.e. clipped to the T-boundary 221). For example, as shown in FIG. 13A, the pixel to be processed, which is indicated as a white circle, is coordinate-moved to the clip point on the T-boundary 221, which is indicated as the black circle.

FIG. 13B is a diagram illustrating the shape of the color gamut conversion. As described above, the color gamut conversion is the movement of the pixel to be processed onto the virtual clip boundary that corresponds to the pixel to be processed. For example, as shown in FIG. 13B, the pixel to be processed 251 is coordinate-moved to the clip point 252 on the V-boundary 261A, and the pixel to be processed 253 is coordinate-moved to the clip point 254 on the V-boundary 261B. That is, the color gamut conversion may be considered to be equivalent to the performing of the same process as the case of the color gamut clip of FIG. 13A for the respective pixels to be processed.

For example, in explaining the Cusp point, the CY coordinates (Ccp_V, Ycp) of the clip points Cusp_V of the Cusp point of the CY coordinates (Ccp, Ycp) can be calculated as in Equation (6) below using the saturation direction compression rate R_ccomp.

$$Cusp\_V = (Ccp\_V, Ycp) = (R\_ccomp \times Ccp, Ycp) \qquad (6)$$

Figure 14:
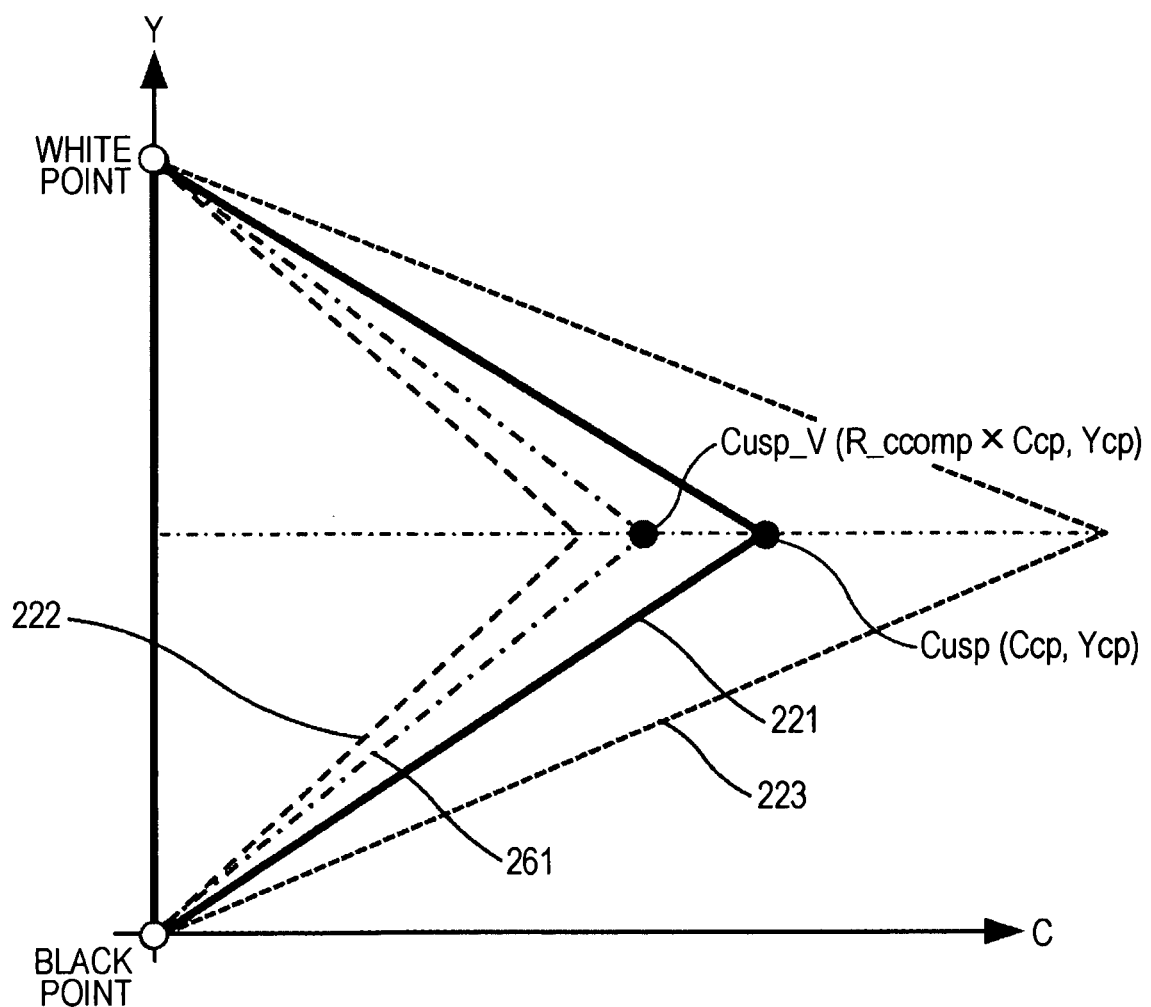
FIG. 14 is a diagram illustrating an example of a virtual clip boundary.

From the CY coordinates of the clip point Cusp_V, the virtual clip boundary (V-boundary) 261 is determined. For example, the virtual clip boundary (V-boundary) 261 of the Cusp point, as illustrated in FIG. 14, is composed of a line segment having the clip point Cusp_V and the white point as its both ends, and a line segment having the clip point Cusp_V and the black point as its both ends.

That is, the V-boundary 261 is determined by the above-described conversion function and the ratio (p:q) of the distance up to the L-boundary 223 of the pixel to be processed to the distance up to the U-boundary 222. In other words, the pixels to be processed, which have the same ratio (p:q) of the distance up to the L-boundary 223 to the distance up to the U-boundary 222, share the V-boundary 261.

Figure 15:
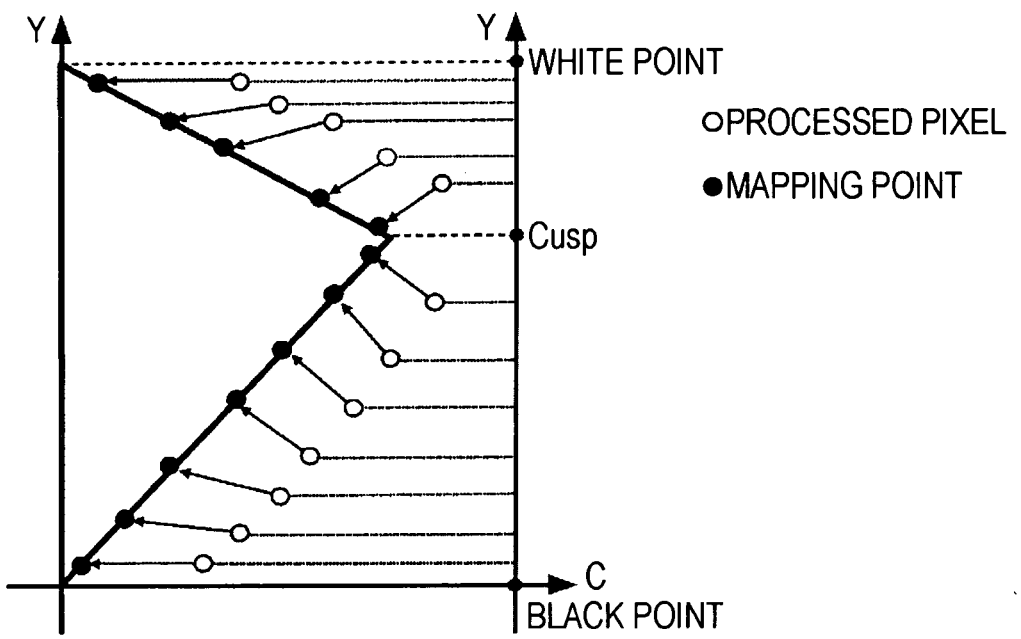
FIG. 15 is a diagram illustrating an example of a shape of coordinate movement in an ideal color gamut conversion.

Once the Cusp_V is determined, the virtual clip color gamut can be determined. After this process, the pixel to be processed is made to map on the virtual clip boundary (V-boundary) as illustrated in FIG. 15.

Here, an ideal mapping direction is considered. Although diverse ways of thinking may exist with respect to the mapping direction, a mapping direction that realizes a natural appearance, for example, as illustrated in FIG. 15, is clipped to a direction in which colors disappear through compression of the saturation in the case where the luminance of the pixel to be processed is close to the white point or the black point, while in the case of the luminance neighboring the Cusp_V, the compression in a direction in which the colors remain, which is not compression simply in the saturation direction, but is the compression which moves somewhat in the luminance direction, is performed.

Figure 16:
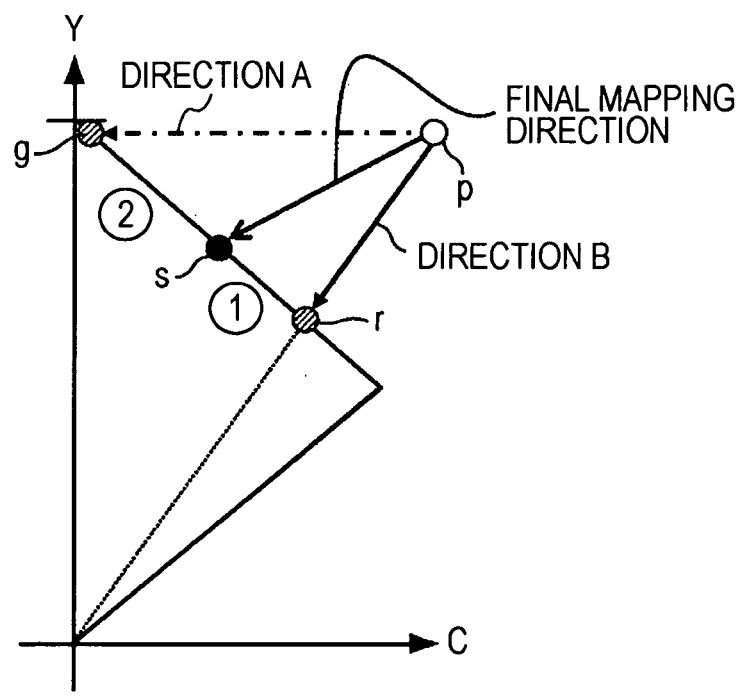
FIG. 16 is a diagram illustrating an example of a shape of a blend.

In order to realize the ideal clip direction, the complicated shape color gamut conversion processing unit 124, for example, as illustrated in FIG. 16, defines at least two kinds of fixed mapping directions. One of the fixed mapping directions corresponds to the mapping (A direction) which erases colors that compress only in the saturation direction, and the other of the fixed mapping directions corresponds to the mapping (B direction) which leaves colors that move in both the saturation direction and the luminance direction. The final mapping direction is determined by blending the two directions in an appropriate ratio. In an example of FIG. 16, the A and B directions are blended in the ratio of 1:2. That is, if it is possible to appropriately define the blend ratio in the fixed mapping directions for the respective pixels to be processed, the ideal mapping direction as illustrated in FIG. 15 can be realized. This is realized using a blend function to be described later.

Figure 17A:
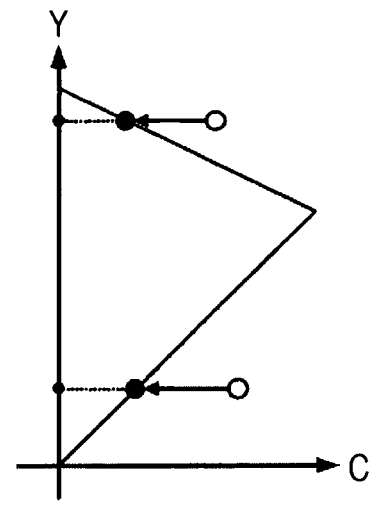
FIGS. 17A to 17C are diagrams illustrating a shape of mapping process in respective directions.
Figure 17B:
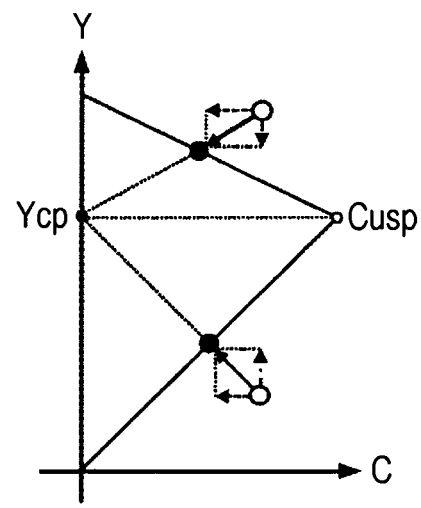
Figure 17C:
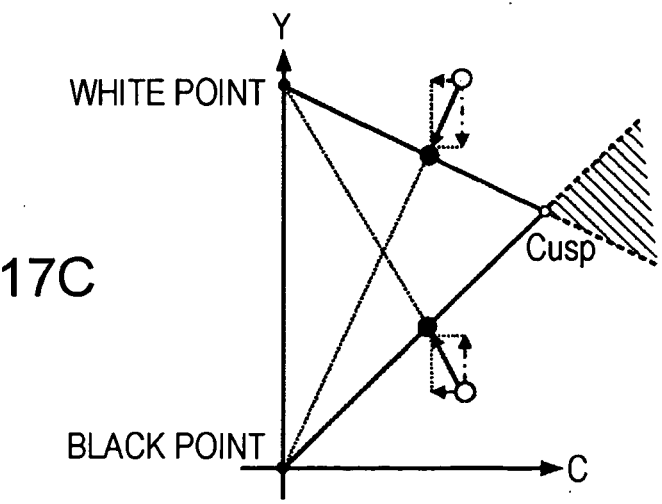

The fixed mapping directions may be considered in diverse ways of thinking, and three kinds of representative mapping directions are exemplified. First is a C-direction mapping as illustrated in FIG. 17A. The C-direction mapping corresponds to a mapping direction for performing compression in the saturation direction. Second is a Cusp direction mapping as illustrated in FIG. 17B. The Cusp direction mapping corresponds to a mapping direction for performing compression with respect to the luminance point of Cusp on the Y-axis (luminance) directions. Third is a BW direction mapping as illustrated in FIG. 17C. The BW direction mapping corresponds to a mapping direction for performing compression toward the black point if the pixel to be processed is brighter than the luminance of the Cusp, while it corresponds to a mapping direction for performing compression toward the white point if the pixel to be processed is darker than the luminance of the Cusp. Hereinafter, with reference to FIG. 18, a method of calculating mapping points in respective directions will be described. Here, the CY coordinates of the pixel to be processed (Ci, Yi), the white point (0, 1), the black point (0, 0), and the Cusp (Ccp, Ycp) are all known.

Referring again to FIG. 8, the complicated shape color gamut conversion processing unit 124 performs calculation of the C-direction mapping point Pc in step S207.

The point Pc is obtained as the cross point of the straight line that connects the pixel to be processed and the luminance point (0, Yi) of the pixel to be processed on Y-axis and the straight line that connects the white point and the Cusp. The C-direction mapping is a mapping for erasing the colors.

In step S208, the complicated shape color gamut conversion processing unit 124 performs the calculation of the BW-direction mapping point Pbw.

The point Pbw is obtained as the cross point of the straight line that connects the pixel to be processed and the black point and the straight line that connects the white point and the Cusp. The BW-direction mapping is a mapping for remaining the colors.

In step S209, the complicated shape color gamut conversion processing unit 124 performs calculation of the Cusp-direction mapping point Pcp.

The point Pcp is obtained as the cross point of the straight line that connects the pixel to be processed and the luminance point (0, Ycp) of the Cusp on the Y-axis and the straight line that connects the white point and the Cusp. The Cusp-direction mapping is a mapping for somewhat remaining the colors.

In step S210, the complicated shape color gamut conversion processing unit 124 performs the calculation of the final mapping point Pout.

Figure 18:
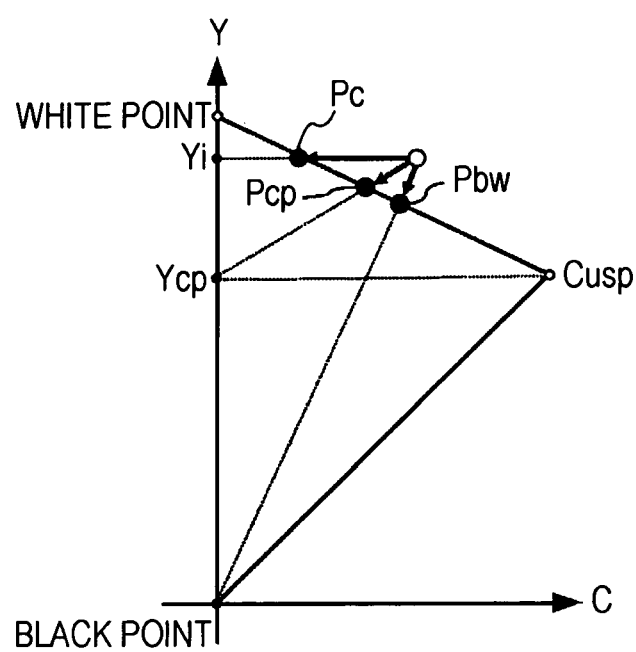
FIG. 18 is a diagram illustrating an example of a difference between mapping directions.

By blending at least two of three fixed direction mapping points calculated as shown in FIG. 18 in an appropriate ratio, the complicated shape color gamut conversion processing unit 124 realizes the ideal compression clip direction points as illustrated in FIG. 15. As described above, the C-direction mapping point is a clip point in a direction for erasing the colors, the BW-direction mapping point is a clip point that leaves the colors, and the Cusp-direction mapping point is an intermediate clip point.

Figure 19:
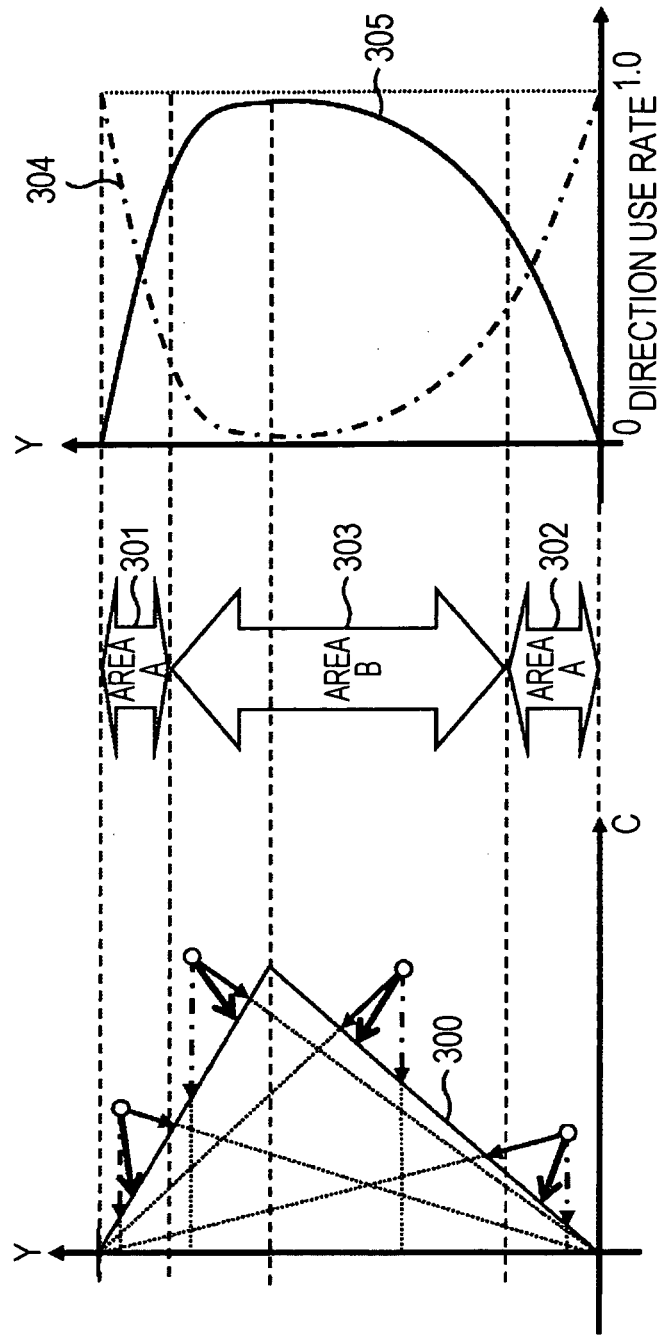
FIG. 19 is a diagram illustrating an example of a blend function.

FIG. 19 is a diagram illustrating an example of a blend function that realizes the ideal compression clip direction points by blending the C-direction mapping point and the BW-direction mapping point. In the case where the luminance in areas A (as indicated by both-side arrows 301 and 302) of FIG. 19 is in the neighborhood of the white point and the black point, the use rate of the C-direction mapping point as illustrated as a curve 304 is heightened, and in the case where the luminance is in an area B (as indicated as both-side arrow 303) of FIG. 19 is in the neighborhood of the Cusp, the use rate of the BW-direction mapping point as illustrated as a curve 305 is heightened. The blend functions (as indicated as curves 304 and 305) of FIG. 19, as illustrated in FIG. 19, may blend two mapping directions, or may blend three mapping directions (including the Cusp-direction mapping). As a result, it is preferable to define the blending functions so that the mapping directions as illustrated in FIG. 15 can be realized.

Figure 20:
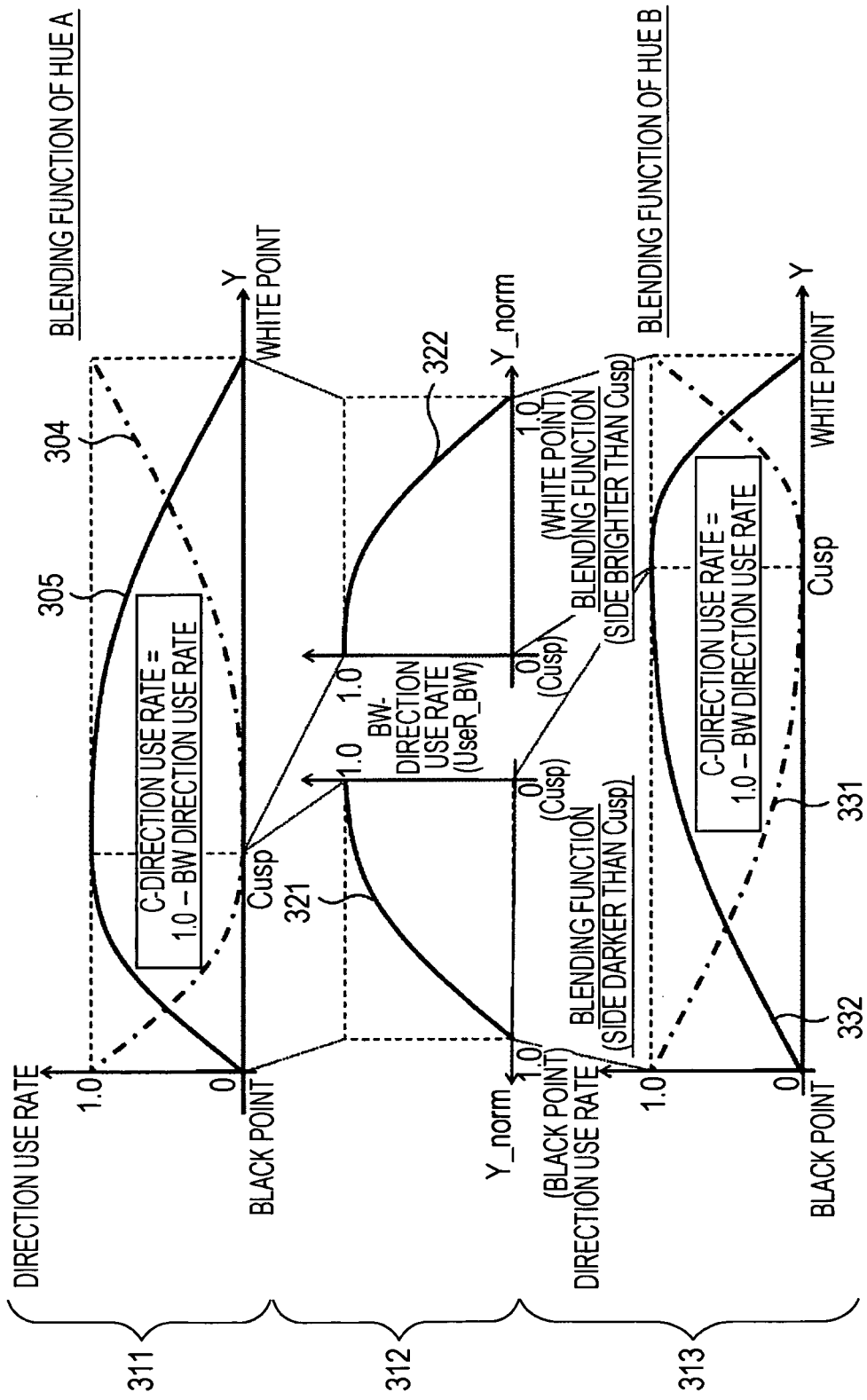
FIG. 20 is a diagram illustrating an example of a blend function.

Two kinds of actual blend functions, which define only the BW-direction use rate, are prepared as indicated in the intermediate portion 312 of FIG. 20. One is a function of the processed pixel on the side that is brighter than that of the Cusp, and the other is a function of the processed pixel on the side that is darker than that of the Cusp. The horizontal axis represents luminance in which the luminance of the Cusp and the white point and the luminance of the Cusp and the black point are normalized into 0.0 and 1.0, respectively. In this case, the C-direction user rate can be obtained by subtracting the BW-direction use rate from 1.0.

Figure 21:
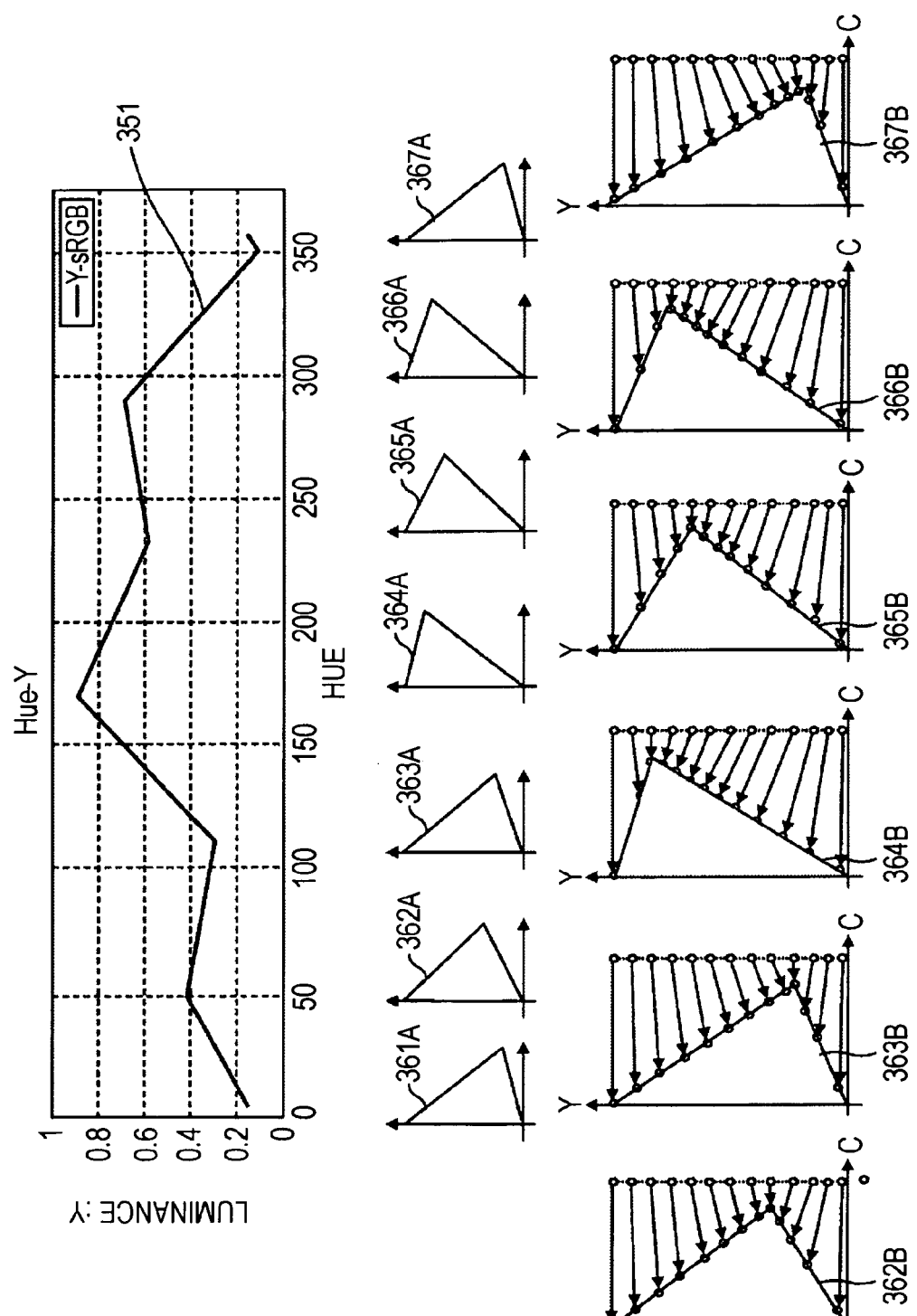
FIG. 21 is a diagram illustrating an example of mapping.

Since the luminance and the saturation of the Cusp point of the color gamut greatly differ according to the hue as illustrated as a curve 351 of the graph in the upper portion of FIG. 21, the shape of the color gamut is also changed accordingly (see color gamuts 361A to 367A in the intermediate portion of FIG. 21). Accordingly, it is preferable that the blend functions are also changed according to the hues, and by defining the functions as in the intermediate portion 312 of FIG. 20, the complicated shape color gamut conversion processing unit 124 can appropriately change the blend functions for the respective hues in accordance with the luminance positions of the Cusp points of the hues. For example, the shapes of the blend functions in somewhat high hue A and hue B in a state where the luminance at the Cusp point is somewhat low are shown in the upper portion 311 and the lower portion 313 of FIG. 20. It can be confirmed that the blend function is changed according to the luminance at the Cusp point. If the blend function is changed as described above, as illustrated in the intermediate portion of FIG. 21, ideal mapping directions as shown in FIG. 18 e.g. the direction for erasing the color in the neighborhood of the white point and the black point and the direction for remaining the color in the neighborhood of the Cusp point as shown as the color gamuts 362B to 367B in the lower portion of FIG. 21, can be realized even though the color gamut shapes are changed for the respective hues.

Referring again to FIG. 8, in step S210, the complicated shape color gamut conversion processing unit 124 performs the calculation of the final mapping point Pout.

The BW-direction use rate that is obtained with reference to the blend function using the luminance Yi of the processed pixel is called UseR_BW. The final mapping point Pout (Co, Yo) can be obtained by Equations (7) and (8) below using the C-direction mapping point (Cc, Yc) and the BW-direction mapping point (Cbw, Ybw).

$$Yo = \text{UseR\_BW} \cdot Ybw + (1.0 - \text{UseR\_BW}) \cdot Yc \quad (7)$$

$$Co = \text{UseR\_BW} \cdot Cbw + (1.0 - \text{UseR\_BW}) \cdot Cc \quad (8)$$

In step S211, the complicated shape color gamut conversion processing unit 124 converts the format of the output content data. If it is assumed that the CY coordinates of the final mapping point obtained by the processing in step S210 are (Co, Yo), the complicated shape color gamut conversion processing unit 124 calculates the YCC coordinates Pout (Yo, Cbo, Cro) of the final mapping point by performing conversion from the YCH coordinate system into the YCC coordinate system as expressed in Equations (9) to (11) below.

Since $Ho = Hi$ $$Yo = Yo \quad (9)$$

$$Cbo = Co \cdot \cos(Ho) \quad (10)$$

$$Cro = Co \cdot \sin(Ho) \quad (11)$$

Further, in step S212, the complicated shape color gamut conversion processing unit 124 converts the YCC data into the final output RGB data (Ro, Go, Bo) as in Equation (12) below.

$$\begin{pmatrix} Ro \\ Go \\ Bo \end{pmatrix} = \begin{pmatrix} 1.0000 & 0.0000 & 1.4020 \\ 1.0000 & -0.3441 & -0.7141 \\ 1.0000 & 1.7720 & 0.0000 \end{pmatrix} \cdot \begin{pmatrix} Yo \\ Cbo \\ Cro \end{pmatrix} \quad (12)$$

Once the RGB coordinates of the final mapping point are calculated, the color gamut conversion processing is ended.

Of course, as the above-described complicated shape color gamut compression algorithm, for example, an algorithm except for the above-described algorithm may be adopted. For example, the operation equations may be executed using high-precision three-dimensional LUT (3DLUT). In the case of using the 3DLUT, it is also possible to perform the color gamut compression in consideration of the user taste, such as non-display of the compression method as operation or the like. Also, in the above-described method, it is exemplified that the color gamut shape can be expressed in the Cusp table. However, by using the 3DLUT, any color gamut shape can be expressed.

3. Third Embodiment

[Simplified Shape Color Gamut Conversion Processing]

Next, details of the simplified shape color gamut conversion processing will be described. Now, it is assumed that a user has designated moving image capturing through the input unit 112 and the instruction has reached respective units through the system control unit 111. The color gamut conversion control unit 121 selects the simplified shape color gamut conversion processing unit 122, and provides the image data obtained from the image capturing unit 113 to the simplified shape color gamut conversion processing unit 122.

Figures 22A, 22B:
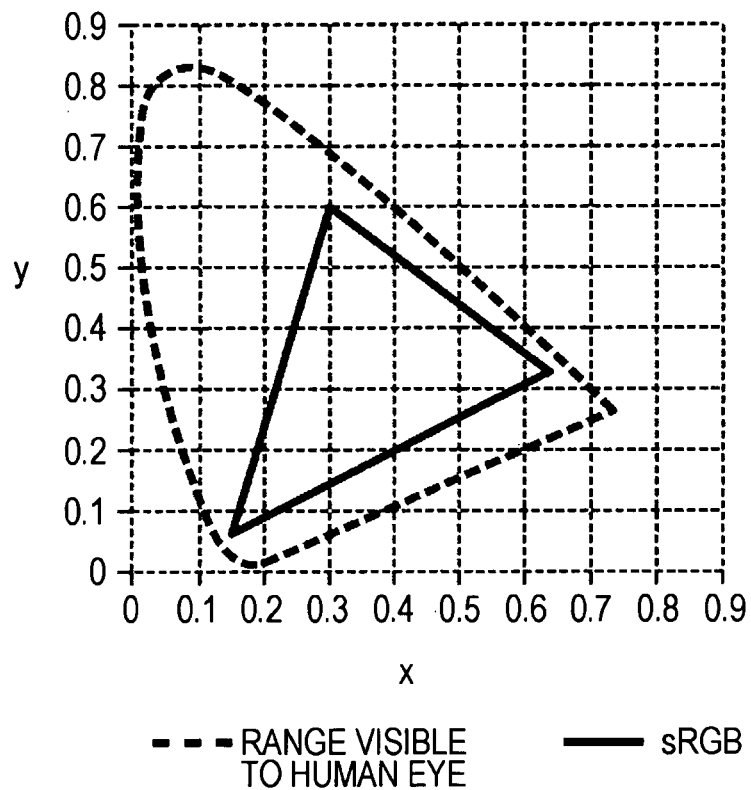
FIGS. 22A and 22B are diagrams illustrating another example of chromaticity information of an output color gamut.

The simplified shape color gamut conversion method that is performed in the embodiment of the present invention will be described. In this case, as illustrated in FIGS. 22A and 22B, it is assumed that the output color gamut corresponds to an sRGB space.

With reference to the flowchart of FIG. 23, an example of a flow of the simplified shape color gamut conversion processing will be described. It is assumed that the processed input RGB data is (Ri, Gi, Bi), and the output RGB data is (Ro, Go, Bo). In the case of the complicated shape color gamut conversion, the color gamut conversion is performed after the input RGB data is converted into YCH data that represents luminance, saturation, and hue. In contrast, in the case of the simplified shape color gamut conversion, the color gamut conversion is performed after the input RGB data is converted into YMM data that represents luminance, maximum value of RGB, and minimum value of RGB. Accordingly, it is possible to obtain the luminance of the Cusp without referring to the Cusp table that represents the color gamuts, and thus the reduction of the use amount of memory, the simplification of the operation processing, and the reduction of the load can be achieved.

Once the simplified shape color gamut conversion processing starts, in step S401, the simplified shape color gamut conversion processing unit 122, in order to seek for the simplification of the operation processing, calculates the data (i.e. YMM data) having the luminance, the maximum value of the RGB data, and the minimum value of the RGB data (Yi, Maxi, Mini) from the RGB data (Ri, Gi, Bi) of the processed pixel using Equations (13) to (15) below.

$$Yi = 0.299 \times Ri + 0.587 \times Gi + 0.114 \times Bi \quad (13)$$

$$\text{Max}i = \max(Ri, Gi, Bi) \quad (14)$$

$$\text{Min}i = \min(Ri, Gi, Bi) \quad (15)$$

Also, it is stored which component of RGB has the maximum value or the minimum value. For example, the order of variables that are called RGBOrder is recorded in the form as in Equation (16).

$$RGB\text{Order} = (3,1,2) \quad (16)$$

The numerals on the right side of Equation (16) indicate the order of red, green, and blue colors, starting from the left, "1" means the minimum value, "2" means the intermediate value, and "3" means the maximum value.

In step S402, the simplified shape color gamut conversion processing unit 122 calculates information of the maximum saturation point Cusp of the color gamut in the hue of the processed pixel (Yi, Maxi, Mini). In order to perform this calculation, here, some geometrical properties in the YCC space of the RGB space will be confirmed.

If the RGB space is converted into the YCC space, the non-saturation axis 401 of the RGB space as illustrated in FIG. 24A becomes Y-axis of the YCC space as illustrated in FIG. 24B. Accordingly, in the YCC space as illustrated in FIG. 24B, the RGB coordinates on the Y-axis become R=G=B, and the YMM coordinates become Y=Max=Min.

Next, the RGB coordinates of the maximum saturation point Cusp on the YCC space in the respective saturations are confirmed. The RGB coordinates for 6 representative colors (R, Y, G, C, B, M) are as shown in a table as illustrated in FIG. 24C, and the shape of the change by the saturation of the Cusp becomes the shape of curves 404 to 406 as illustrated in FIG. 24D.

From them, it can be confirmed that any one among the RGB coordinates of the Cusp is surely "1" and "0". Accordingly, as illustrated in FIG. 24E, it can be known that the YMM coordinates of the Cusp are (Ycp, 1, 0) if the Y coordinate is set to Ycp. Further, the YMM coordinates on the line 407 that connects the white point and the Cusp point are confirmed. Since the YMM coordinates of the white point is (1, 1, 1) and the YMM coordinates of the Cusp point is (Ycp, 1, 0), it can be known that the maximum value of the color point on the straight line 407 that connects the white point and the Cusp point is "1".

As described above, using the confirmed geometrical properties, the unclear information, i.e. Ycp, is obtained from the YMM coordinates of the Cusp. As illustrated in FIG. 25, if it is assumed that the processed pixel is Pi (Yi, Maxi, Mini), the minimum coordinates of the color point which has the luminance Yi that is the same as Pi, and which is on the line that connects the white point and the Cusp point is called α. If α is known, it is the similar figure of ΔF and ΔG as illustrated in FIG. 25, and thus the Ycp can be calculated by Equation (17) below.

$$\text{From } (1 - Ycp) : (1 - Yi) = 1 : (1 - \alpha) \quad (17)$$

$$Ycp = \frac{Yi - \alpha}{1 - \alpha}$$

At this time, as illustrated in FIG. 25, the ratio w can be calculated by Equation (18) below.

$$w = \frac{1 - Yi}{\text{Max}i - Yi} \tag{18}$$

Accordingly, α in Equation (17) can be calculated by Equation (19) below using the ratio w.

$$\alpha - Yi = (\text{Min}i - Yi) \times w$$

$$\therefore \alpha = (\text{Min}i - Yi) \times w + Yi \tag{19}$$

By arrangement through substitution of Equation (19) in Equation (17), the Ycp can be finally calculated from Equation (20) below using the YMM coordinates (Yi, Maxi, Mini) of the processed pixel.

$$Ycp = \frac{Yi - \text{Min}i}{\text{Max}i - \text{Min}i} \tag{20}$$

Accordingly, using this method, the simplified shape color gamut conversion processing unit 122 can calculate the Cusp information (i.e. YMM coordinates of the Cusp) only by knowledge of the YMM coordinates of the processed pixel without referring to the color gamut information, and determine the color gamut necessary for color gamut compression of the processed pixel.

The simplified shape color gamut conversion processing unit 122 performs designation of the non-mapping boundary (U-boundary) and the mapping limit boundary (L-boundary) in step S403.

In the same manner as the complicated shape color gamut conversion, the LU table 231 as illustrated in FIG. 10B may be referred to. However, in order to promote the speed increases and simplification of the processing in the simplified shape color gamut conversion, the L-boundary is set to 1.5 and the U-boundary is set to 0.75 without following the hue. Accordingly, the simplified shape color gamut conversion processing unit 122 can set the L-boundary and the U-boundary only by referring to integers (i.e. it becomes unnecessary to refer to the LU table for the respective hues).

In step S404, the simplified shape color gamut conversion processing unit 122 performs the definition of the conversion function. The method of referring to the conversion function (e.g. see FIG. 11) is the same as that in the complicated shape color gamut conversion. However, it is possible to study the reduction of the number of constituent data of the conversion function.

Figure 26:
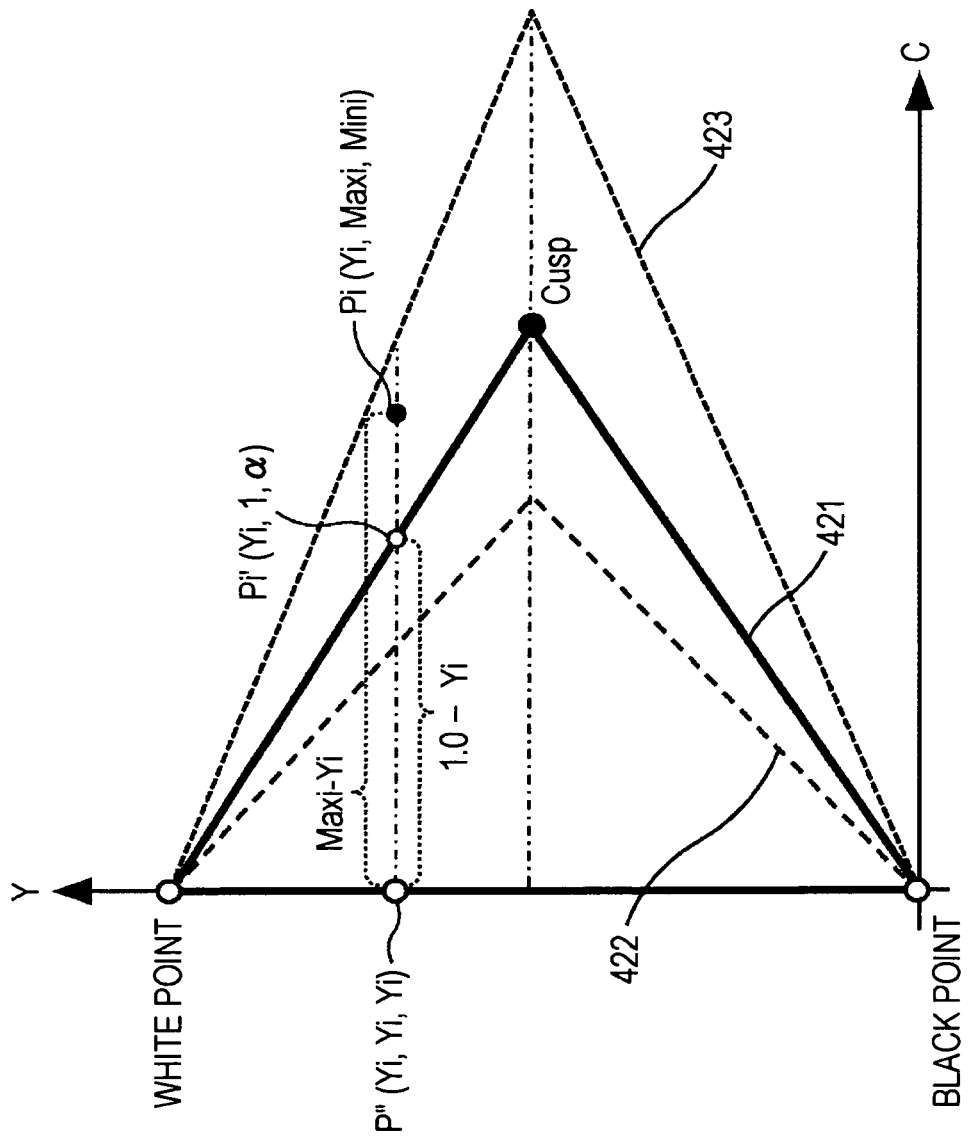
FIG. 26 is a diagram illustrating an example of saturation calculation for referring to compression function.

In step S405, the simplified shape color gamut conversion unit 122 determines the virtual clip space. The simplified shape color gamut conversion processing unit 122 refers to the conversion function using the YMM coordinates of the processed pixel. Since the conversion function has a value Ci_norm obtained by normalizing the saturation in the T-boundary to "1", as shown in FIG. 26, the value Ci_norm can be obtained from Equation (21) below in the simplified shape color gamut conversion.

$$Ci\_norm = \frac{\text{Max}i - Yi}{1.0 - Yi} \tag{21}$$

The simplified shape color gamut conversion processing unit 122 determines the saturation-direction compression rate R_ccomp of the processed pixel, for example, by referring to the conversion function as illustrated in FIG. 11 using the value Ci_norm. The simplified shape color gamut conversion processing unit 122, in the same manner as the complicated shape color gamut conversion, can realize the color gamut conversion by determining the virtual clip color gamut for each processed pixel and repeating the clip processing as illustrated in FIGS. 13A and 13B using the compression rate R_ccomp.

Figure 27:
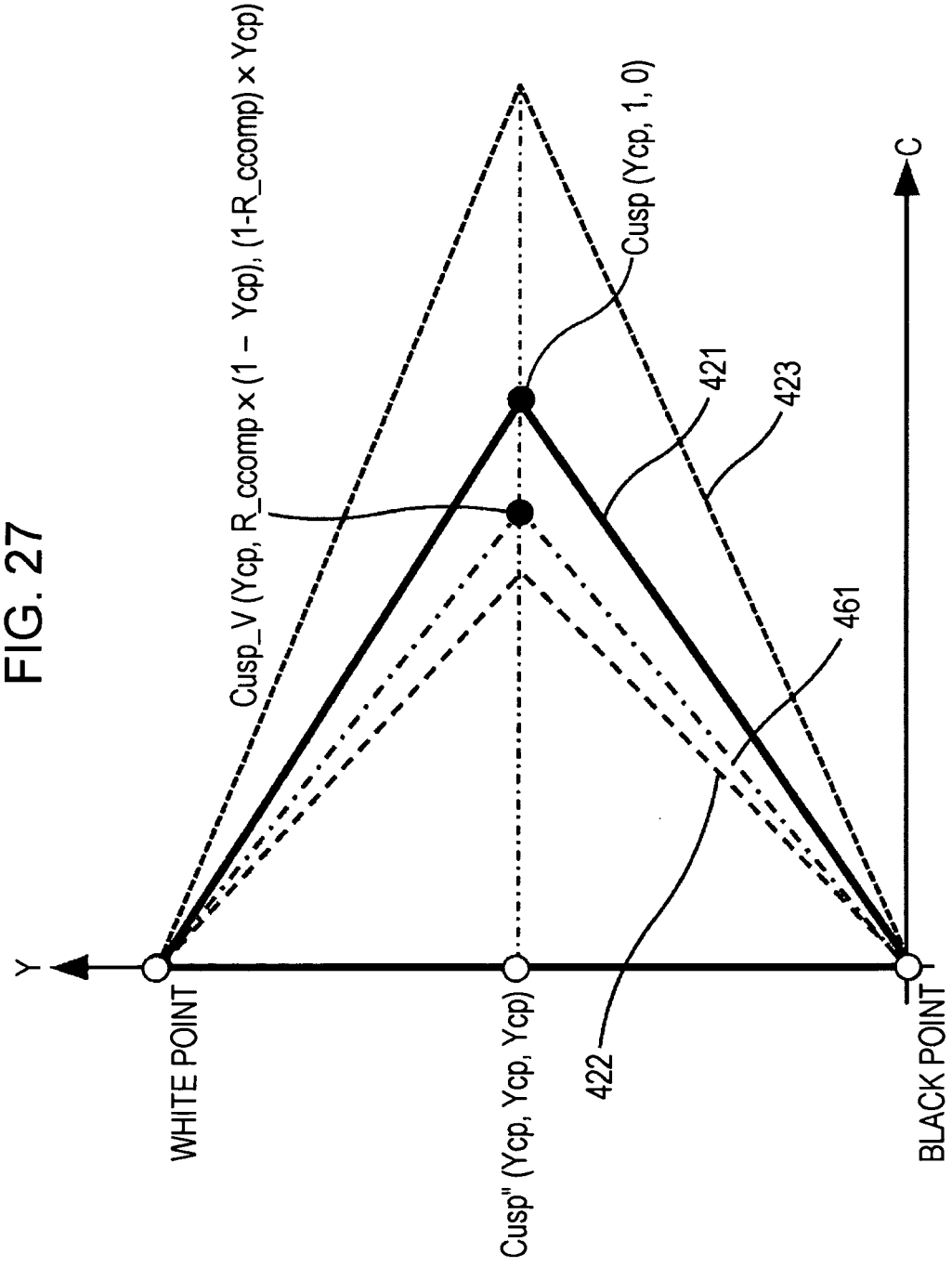
FIG. 27 is a diagram illustrating an example of a shape of virtual clip space determination.

The shape of the clip processing is shown in FIG. 27. the YMM coordinates of the Cusp point are (Ycp, 1, 0), and the YMM coordinates of the color point (Cusp") on the Y-axis having the same luminance as the luminance of the Cusp point are (Ycp, Ycp, Ycp). The maximum value of the YMM coordinates is linearly increased in directions from the Y-axis to the Cusp point and from Ycp to "1". Also, the minimum value is linearly decreased in a direction from Ycp to "0". Accordingly, if it is assumed that the compression rate from the T-boundary 421 is R_ccomp, the YMM coordinates of the Cusp_V located between them can be calculated by Equation (22) below.

$$YMM \text{ Coordinates } (Ycp, Maxcpv, Mincpv) \text{ of Cusp\_}V = (Ycp, R\_ccomp \times (1 - Ycp), (1 - R\_ccomp) \times Ycp)) \tag{22}$$

Once the Cusp_V is determined, the simplified shape color gamut conversion processing unit 122, as illustrated in FIG. 27, can determine the virtual clip space from the V-boundary 461, and thus can perform the mapping process on the color gamut.

In step S406, the simplified shape color gamut conversion processing unit 122 obtains the C-direction mapping point Pc (see FIG. 17A) that indicates the saturation C-direction mapping process. The C-direction mapping point Pc can be obtained as the cross point of the straight line that connects the processed pixel and the luminance point (Yi, Yi, Yi) of the processed pixel on the Y-axis and the straight line that connects the white point and the Cusp point. The C-direction mapping is a mapping for erasing the colors.

In step S407, the simplified shape color gamut conversion processing unit 122 obtains the BW-direction mapping point Pbw (see FIG. 17B) that indicates the mapping place in the BW direction. The BW-direction mapping point Pbw can be obtained as the cross point of the straight line that connects the processed pixel and the black point and the straight line that connects the white point and the Cusp point. The BW-direction mapping is a mapping for remaining the colors.

In step S408, the simplified shape color gamut conversion processing unit 122 obtains the Cusp-direction mapping point Pcp that indicates the mapping place in the Cusp direction. The Cusp-direction mapping point Pcp can be obtained as the cross point of the straight line that connects the processed pixel and the luminance point (Ycp, Ycp, Ycp) of the Cusp point on the Y-axis and the straight line that connects the white point and the Cusp point. The Cusp-direction mapping is a mapping for remaining the colors.

In step S409, the simplified shape color gamut conversion processing unit 122 calculates the final mapping point Pout by blending the respective mapping points obtained in the respective processes in steps S406 to S408 according to the blend function.

For example, it is assumed that the BW-direction use rate obtained with reference to the blend function as illustrated in FIG. 19 or 20 using the luminance Yi of the processed pixel is UseR_BW. By using the C-direction mapping point Pc (Yc, Maxc, Minc) and the BW-direction mapping point Pbw (Ybw, Maxbw, Minbw), the final mapping point Pout (Yo, Maxo, Mino) can be obtained as in Equations (23) to (25) below.

$$Yo = UseR\_BW \cdot Ybw + (1.0 - UseR\_BW) \cdot Yc \quad (23)$$

$$Maxo = UseR\_BW \cdot Maxbw + (1.0 - UseR\_BW) \cdot Maxc \quad (24)$$

$$Mino = UseR\_BW \cdot Minbw + (1.0 - UseR\_BW) \cdot Minc \quad (25)$$

In step S410, the simplified shape color gamut conversion processing unit 122 first determines two colors among Ro, Go, and Bo using RGBOrder that is the information which is preserved when the input RGB data is converted into the YMM data in the process in step S401 and which indicates which color of RGB has the maximum value or the minimum value. In this case, from the Equation (16), the maximum value is R and the minimum value is G. Accordingly, Ro and Go can be obtained by Equations (26) and (27) below.

$$Ro = Maxo \quad (26)$$

$$Go = Mino \quad (27)$$

The remaining Bo can be obtained using Equation (28) below from the luminance generation equation.

$$Yo = 0.299 \times Ro + 0.587 \times Go + 0.114 \times Bo \quad (28)$$

$$\therefore Bo = \frac{Yo - 0.299 \times Ro - 0.587 \times Go}{0.114}$$

Once the final output RGB data is calculated, the simplified shape color gamut conversion processing is ended.

As described above, the simplified shape color gamut conversion processing unit 122 can perform the color gamut conversion easier than the complicated shape color gamut conversion processing.

4. Fourth Embodiment

[Simplified Shape Color Gamut Conversion Processing 2]

The simplified shape color gamut conversion processing algorithm may be one other than the above-described algorithms, or for example, may be further simplified. Another example of the flow of the simplified shape color gamut conversion processing will be described with reference to the flowchart of FIG. 28.

Figure 23:
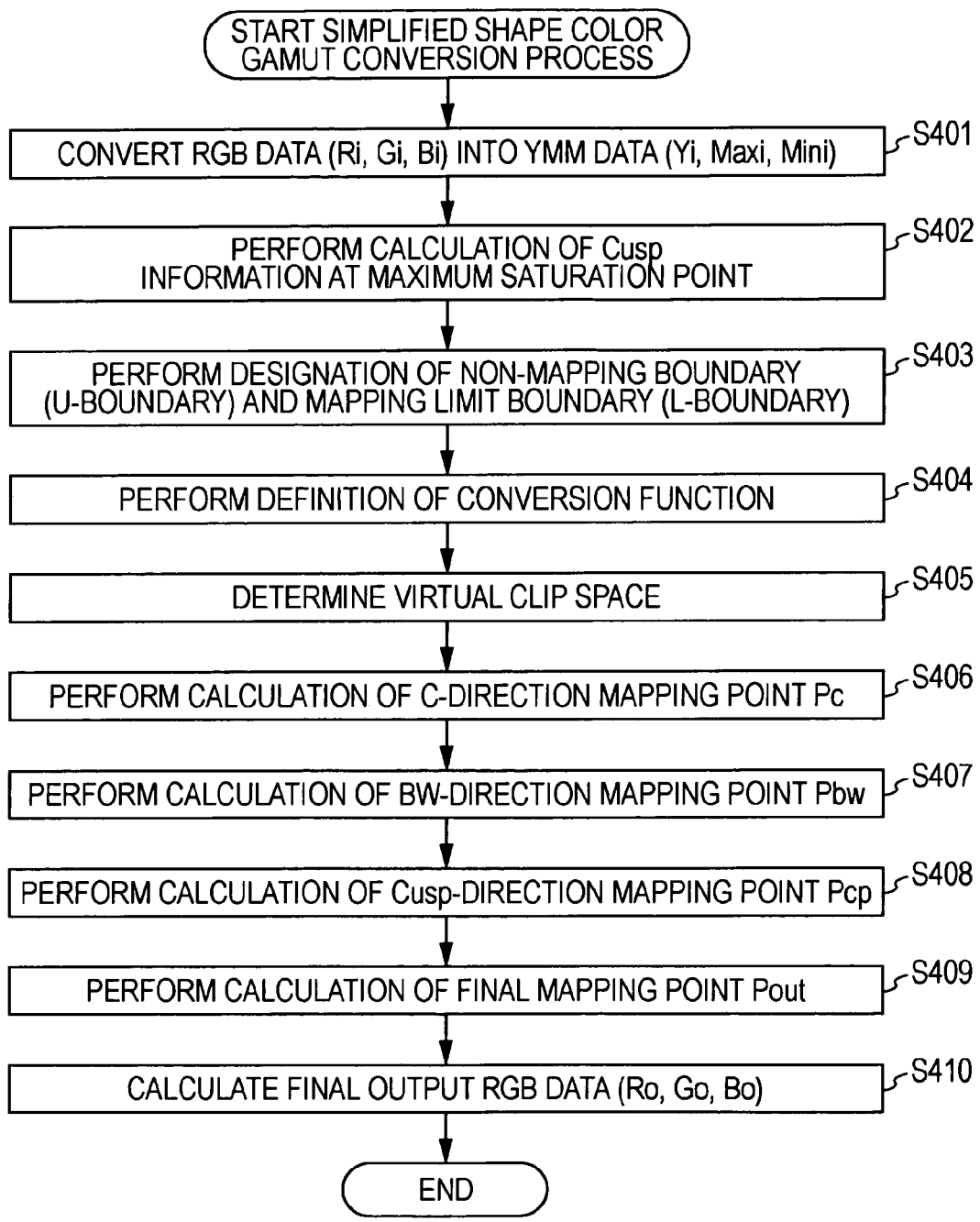
FIG. 23 is a flowchart illustrating an example of a flow of a simplified shape color gamut conversion process.
Figure 28:
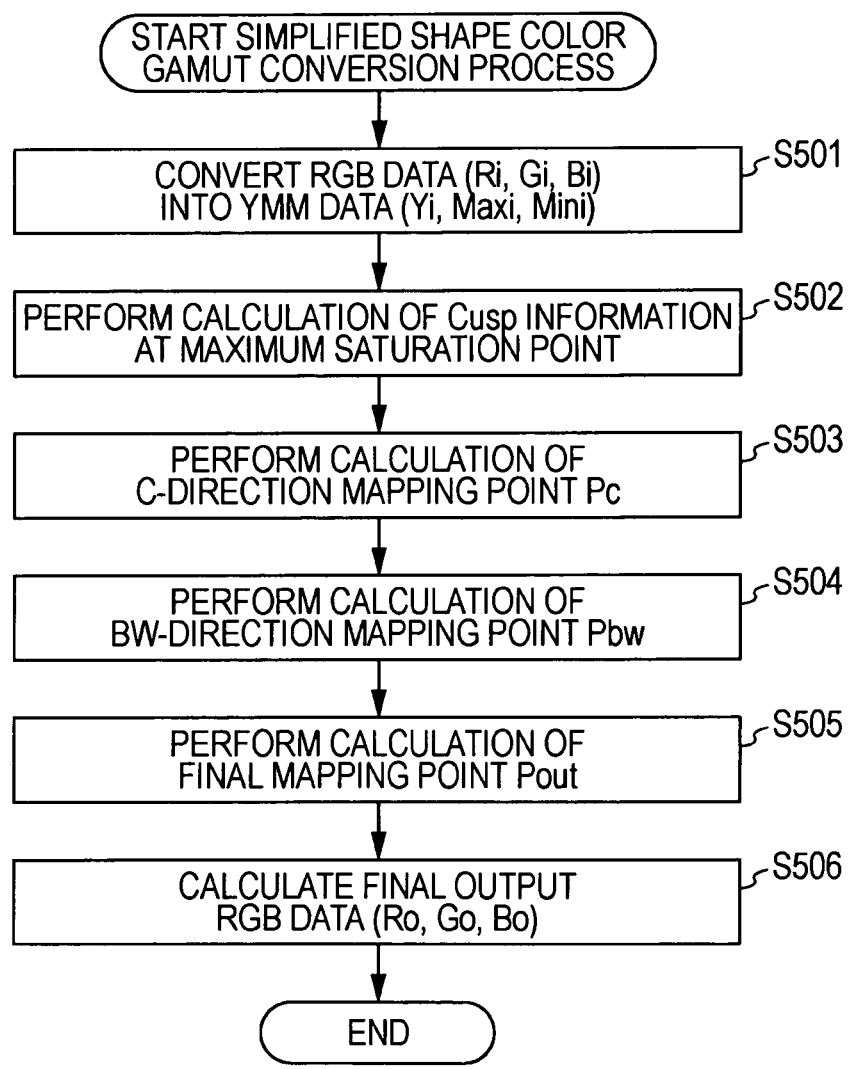
FIG. 28 is a flowchart illustrating another example of a flow of a simplified shape color gamut conversion processing.

In FIG. 28, the simplified shape color gamut conversion processing unit 122 performs the respective processes in steps S501 and S502 in the same manner as those in steps S401 and S402 of FIG. 23.

However, in FIG. 28, the simplified shape color gamut conversion processing unit 122 performs clip processing as shown as a solid line 241A in FIG. 11 without compressing the color gamut. Accordingly, the processes corresponding to the steps S403 to S405 are omitted, and the mapping process is performed.

The simplified shape color gamut conversion processing unit 122 performs the respective processes in steps S503 and S504 in the same manner as the processes in the step S406 and S407 in FIG. 23.

However, in FIG. 28, the blending mapping directions are limited to two directions. Accordingly, the process corresponding to the step S408 is omitted.

In step S505, the simplified shape color gamut conversion processing unit 122 obtains the final mapping point Pout by blending the C-direction mapping point Pc obtained by the processing in step S503 and the BW-direction mapping point Pbw obtained by the processing in step S504.

In step S506, the simplified shape color gamut conversion processing unit 122 calculates the final output RGB data (Ro, Go, Bo) in the same manner as the step S410 of FIG. 23, and end the simplified shape color gamut conversion processing.

By doing this, the simplified shape color gamut conversion processing unit 122 can further simplify the color gamut conversion processing, and thus can realize the reduction of the processing time and the load. Accordingly, the real-time processing performance can be heightened.

5. Fifth Embodiment

[Control Processing 2 During Recording]

Figure 3:
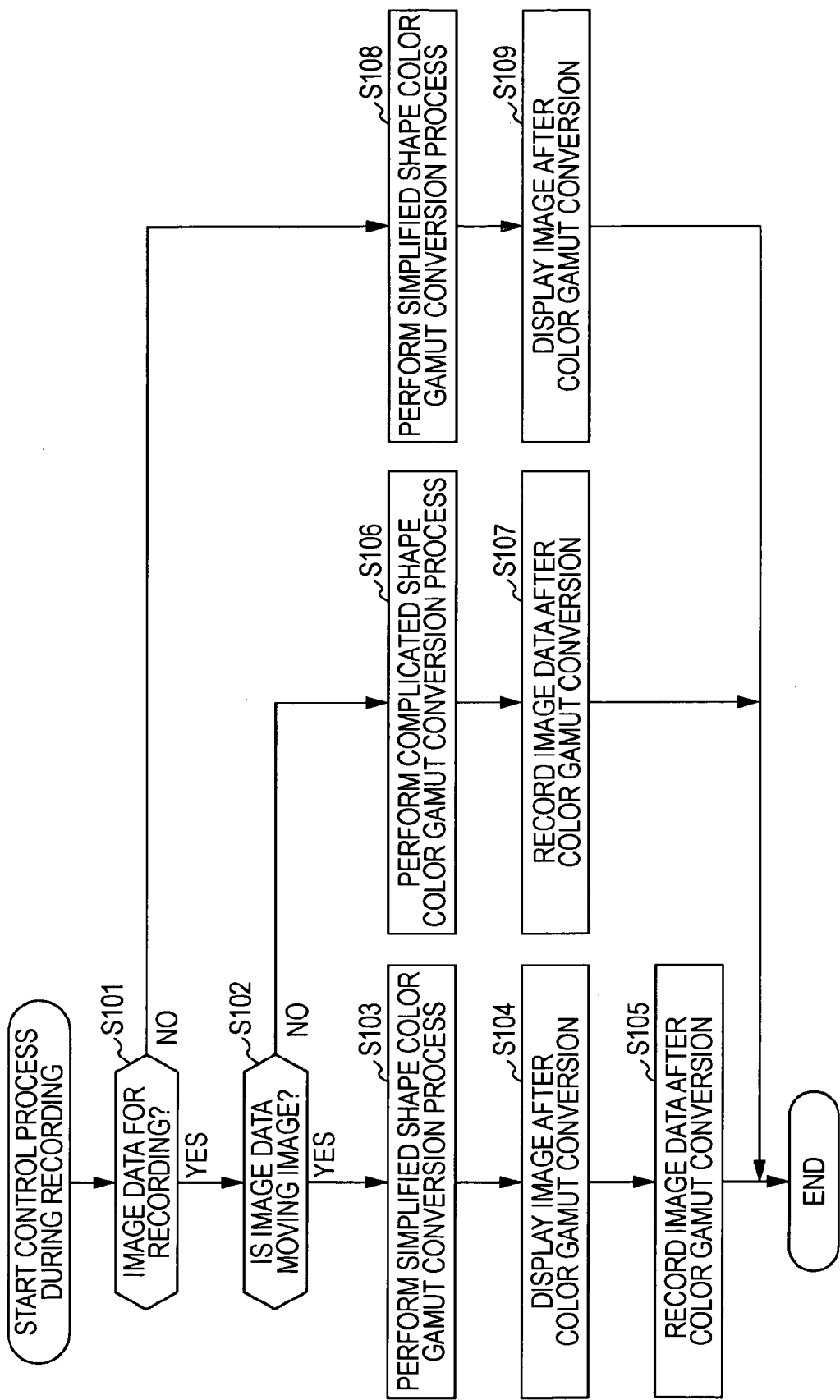
FIG. 3 is a flowchart illustrating an example of a flow of control processing during recording.

The control processing during recording may be performed using an algorithm except for the above-described algorithm with reference to the flowchart of FIG. 3. For example, the color gamut conversion processing during recording may be selected using another condition.

Figure 29:
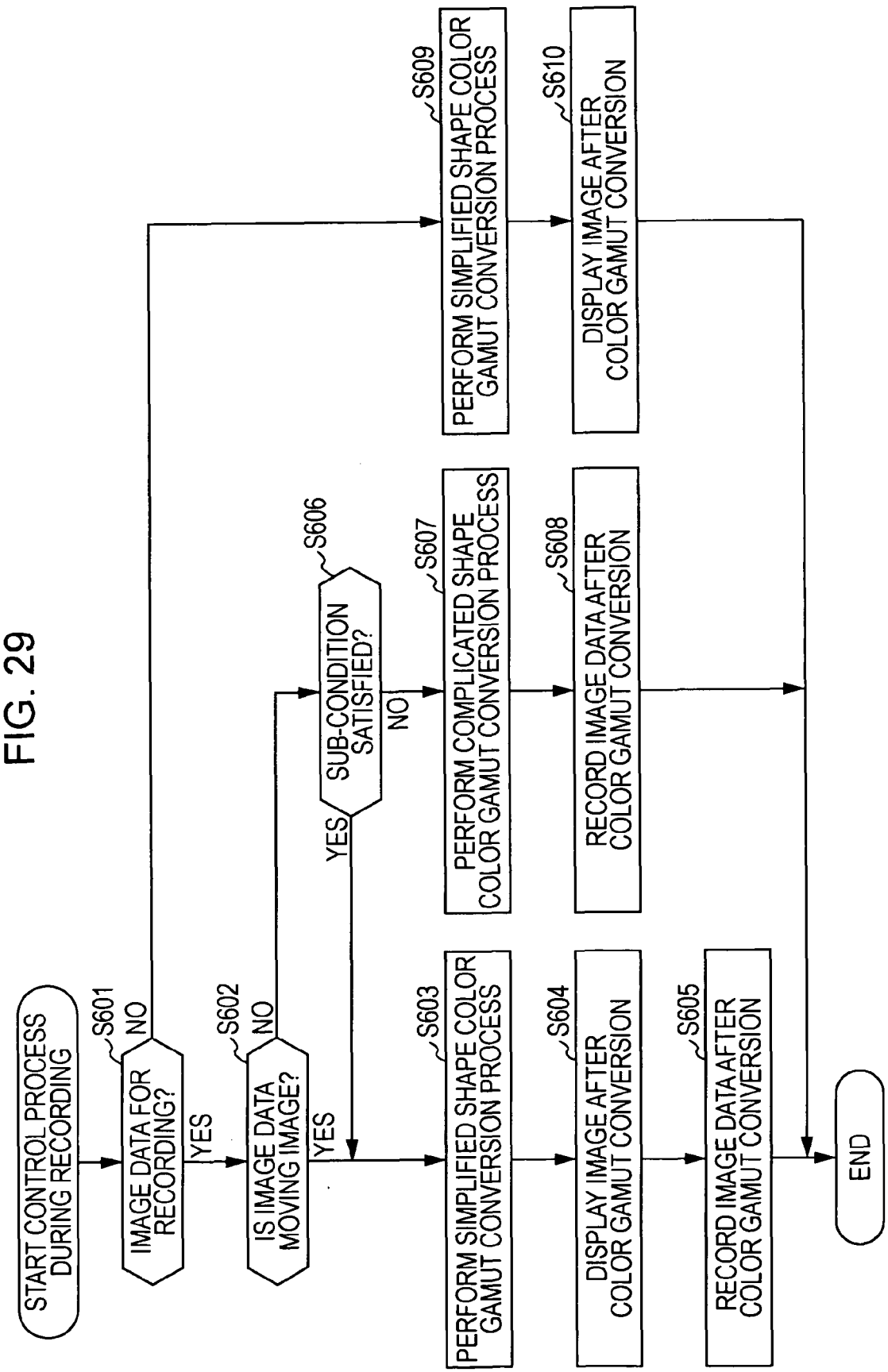
FIG. 29 is a flowchart illustrating another example of a flow of control processing during recording.

With reference to the flowchart of FIG. 29, another example of the flow of the control processing will be described.

Even in this case, the respective units of the video camera 101 perform the control processing during recording in the same manner as the control processing as described above with reference to the flowchart of FIG. 3.

However, if it is determined that the image data is a still image in step S602, the color gamut conversion control unit 121 determines whether a sub-condition is satisfied in step S606. The sub-condition is to further limit the use of the image data. If it is determined that the sub-condition is satisfied, the processing returns to the step S603, and the image data is converted by the simplified shape color gamut conversion processing. Also, if it is determined that the sub-condition is not satisfied in the step S606, the processing proceeds to step S607, and the image data is converted by the complicated shape color gamut conversion processing.

That is, if the sub-condition is satisfied even though the image data is a still image, the color gamut conversion control unit 121 controls to perform the simplified shape color gamut conversion of the image data in the same manner as the case in which the image data is a moving image, and control to perform the complicated shape color gamut conversion of only the still image that does not satisfy the sub-condition.

The sub-condition may be any one that limits the use of the image data, and an example thereof is shown in FIG. 30.

For example, the sub-condition may be "the color gamut information can be recorded together with the image data".

In this case, the color gamut information may be considered in diverse manners, and as the existing one, the annexed color gamut information using the ICC profile may be the color gamut information recorded in a header of Exif (Exchangeable Image File Format). If the annexing of the color gamut information is possible during recording, in the input device, it is not necessary to perform the color gamut compression in the final output device, and the color gamut information may be annexed to the RGB color gamut, which has been compressed as an appropriate standard RGB color gamut (that may be the standard RGB color gamut somewhat wider than the sRGB). Accordingly, the color gamut conversion control unit 121 controls to perform the simplified shape color gamut conversion.

Also, for example, the sub-condition may be "it is assumed that the capturing mode is accurately to be used in a display device".

For example, if the still image capturing mode is on the assumption that the display device is accurately considered as the output device, such as "web content data capturing mode", "capturing mode for transmission to a portable phone", "capturing mode for viewing photo frames", and the like, the compression place color gamut is limited to the RGB color gamut. Accordingly, the color gamut conversion control unit 121 controls to perform the simplified shape color gamut conversion of the image data in order to convert the color gamut into an appropriate RGB color gamut.

In this case, as the compression place RGB color gamut, for example, it is considered that the sRGB is effective. In this case, the use of a wide color gamut display in portable phones or photo frames has recently been increasing, and if such a display becomes the object of processing, restoration meta information that includes information necessary to restore the color gamut before color gamut conversion may be annexed together with color gamut information of the compressed standard RGB color gamut, and the display device may be made to appropriately execute the restoration process or color gamut conversion.

Further, for example, the sub-condition may be "the capturing mode is a continuous capturing mode".

If the still image capturing mode is a continuous capturing mode, speed is necessitated, and the color gamut conversion control unit 121 controls to perform the simplified color gamut conversion of the image data that has a high processing speed. Further, the conversion place color gamut may be fixed to the standard RGB system (e.g. sRGB or the like), and the density of processing may be limited.

As described above, if the image data is a still image, the video camera 101 selects the color gamut conversion processing further using the sub-condition, and thus unnecessarily heavy processing is not performed to achieve an efficient color gamut conversion operation.

6. Sixth Embodiment

[Personal Computer]

The above-described series of processing may be performed by hardware or by software. In this case, for example, a personal computer as illustrated in FIG. 31 may be configured.

In FIG. 31, a CPU (Central Processing Unit) 701 of a personal computer 700 executes various kinds of processing according to a program stored in a ROM (Read Only Memory) 702 or a program loaded from a storage unit 713 to a RAM (Random Access Memory) 703. In the RAM 703, data necessary for the CPU 701 to execute various kinds of processing is appropriately stored.

The CPU 701, the ROM 702, and the RAM 703 are connected together through a bus 704. To this bus 704, an input/output interface 710 is also connected.

To the input/output interface 710, an input unit 711 composed of a keyboard, a mouse, and the like, a display composed of a CRT (Cathode Ray Tube), an LCD (Liquid Crystal Display), or the like, an output unit 712 composed of a speaker or the like, a storage unit 713 composed of a hard disc or the like, and a communication unit 714 composed of a modem or the like are connected. The communication unit 714 performs communication process through a network including the Internet.

To the input/output interface 710, if necessary, a drive 715 is connected, and removable media 721 such as a magnetic disc, an optical disc, an optomagnetic disc, a semiconductor memory, or the like, is appropriately mounted, and a computer program read from them is installed in the storage unit 713 if necessary.

In the case of executing the above-described series of processing by software, a program configuring the software is installed from a network or a recording medium.

The recording medium, for example, separately from a device main body as illustrated in FIG. 31, may be configured not only by a removable media 721 composed of a magnetic disc (including a flexible disc) recorded with a program distributed to transmit a program to a user, an optical disc (including a CD-ROM (Compact Disc-Read Only Memory) and a DVD (Digital Versatile Disc)), an optimagnetic disc (including MD (Mini Disc)), a semiconductor memory, or the like, but also by a ROM 702 recorded with a program which is pre-inserted into the device main body to be transferred to a user, a hard disc included in the storage unit 713, or the like.

In this case, a program executed by a computer may be a program that performs processing in a time-series manner according to the order as described above in the specification or may be a program that performs processing in parallel or separately when such processing is necessary.

In addition, in this specification, the steps describing the program recorded on the recording medium include processes performed in a time-series manner according to the order as described above and processes performed in parallel or separately even though it is not necessarily performed in a time-series manner.

Also, in this specification, the system indicates the whole device configured by a plurality of devices.

Also, as described above, the configuration explained as one device (or a processing unit) may be divided into a plurality of devices (or processing units). In contrast, as described above, a plurality of devices (or processing units) may be gathered and configured as one device (or a processing unit). Also, it is also possible to add a configuration in addition to the above-described devices (or processing units). Further, if the configuration or operation is substantially the same as the whole system, a part of the configuration of a certain device (or a processing unit) may be included in the configuration of another device (or another processing unit). The present invention is not limited to the above-described embodiments, and diverse modifications can be made without departing from the scope of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
 a control unit operable to control a color gamut conversion method that converts a color gamut of content data into a first color gamut in accordance with use of the content data,
 wherein if the content data corresponds to a moving image, the control unit selects a first conversion method according to use of the moving image, while if the content data corresponds to a still image, the control unit selects a second conversion method according to use of the still image,
 wherein if the content data corresponds to the still image, the control unit restricts the use of the content data by further using a sub-condition, and if the content data satisfies the sub-condition, the control unit selects the first conversion method according to the use of the moving image, while if the content data does not satisfy the sub-condition, the control unit selects the second conversion method according to the use of the still image; and a color gamut conversion unit operable to perform the color gamut conversion with respect to the content data by the selected one of: the first conversion method and the second conversion method based on control of the control unit.

2. The information processing apparatus according to claim 1, wherein if the content data corresponds to the moving image, the color gamut conversion unit performs a first shape color gamut conversion process that converts the color gamut of the content data into a first shape color gamut with respect to the content data, while if the content data corresponds to the still image, the color gamut conversion unit performs a second shape color gamut conversion process that converts the color gamut of the content data into a second shape color gamut with respect to the content data.

3. The information processing apparatus according to claim 1, wherein the sub-condition is capability to add color gamut information to the content data when the content data is recorded.

4. The information processing apparatus according to claim 1, further comprising an image capturing unit operable to capture a subject and generate the content data, wherein the sub-condition corresponds to a mode in which the image capturing unit generates the content data for image display.

5. The information processing apparatus according to claim 1, further comprising an image capturing unit operable to capture a subject and generating the content data, wherein the sub-condition corresponds to a continuous capturing mode in which the image capturing unit continuously performs capturing.

6. An information processing method comprising:
controlling by a control unit of an information processing apparatus a color gamut conversion method that converts a color gamut of content data into one of a first color gamut or a second color gamut in accordance with use of the content data, wherein if the content data corresponds to a moving image, the control unit selects a first conversion method according to a use of the moving image, and wherein if the content data corresponds to a still image, the control unit determines whether the content data satisfies a sub-condition, wherein if the content data satisfies the sub-condition, the control unit selects the first conversion method, and wherein if the content data does not satisfy the sub-condition, the control unit selects a second conversion method according to a use of the still image; and performing by a color gamut conversion unit of the information processing apparatus, the color gamut conversion with respect to the content data, by the selected one of: the first conversion method and the second conversion method based on control of the control unit.

7. The information processing method according to claim 6, wherein the sub-condition is capability to add color gamut information to the content data when the content data is recorded.

8. The information processing method according to claim 6, wherein the sub-condition corresponds to a mode in which an image capturing unit generates the content data for image display.

9. The information processing method according to claim 6, wherein the sub-condition corresponds to a continuous capturing mode in which an image capturing unit continuously performs capturing.

10. A non-transitory computer-readable storage medium having stored thereon, a computer program having at least one code section for information processing, the at least one code section being executable by a computer for causing the computer to perform steps comprising:
controlling a color gamut conversion method that converts a color gamut of content data into one of a first color gamut or a second color gamut in accordance with use of the content data, wherein if the content data corresponds to a moving image, selecting a first conversion method according to a use of the moving image, and wherein if the content data corresponds to a still image, determining whether the content data satisfies a sub-condition, wherein if the content data satisfies the sub-condition, selecting the first conversion method, and wherein if the content data does not satisfy the sub-condition, selecting a second conversion method according to a use of the still image; and performing the color gamut conversion with respect to the content data by the selected one of: the first conversion method and the second conversion method based on the control of the control unit.

11. The computer-readable storage medium according to claim 10, wherein the sub-condition is capability to add color gamut information to the content data when the content data is recorded.

12. The computer-readable storage medium according to claim 10, wherein the sub-condition corresponds to a mode in which an image capturing unit generates the content data for image display.

13. The computer-readable storage medium according to claim 10, wherein the sub-condition corresponds to a continuous capturing mode in which an image capturing unit continuously performs capturing.

* * * * *